United States Patent
Wang et al.

(10) Patent No.: US 11,381,656 B2
(45) Date of Patent: Jul. 5, 2022

(54) SERVICE LAYER MESSAGE TEMPLATES IN A COMMUNICATIONS NETWORK

(71) Applicant: CONVIDA WIRELESS, LLC, Wilmington, DE (US)

(72) Inventors: Chonggang Wang, Princeton, NJ (US); Quang Ly, North Wales, PA (US); Xu Li, Plainsboro, NJ (US); Dale N. Seed, Allentown, PA (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 116 days.

(21) Appl. No.: 16/645,971

(22) PCT Filed: Sep. 14, 2018

(86) PCT No.: PCT/US2018/051037
§ 371 (c)(1),
(2) Date: Mar. 10, 2020

(87) PCT Pub. No.: WO2019/055760
PCT Pub. Date: Mar. 21, 2019

(65) Prior Publication Data
US 2020/0204637 A1    Jun. 25, 2020

Related U.S. Application Data

(60) Provisional application No. 62/558,940, filed on Sep. 15, 2017.

(51) Int. Cl.
*H04L 67/565* (2022.01)
*H04W 4/70* (2018.01)
*H04L 67/561* (2022.01)

(52) U.S. Cl.
CPC ...... *H04L 67/2823* (2013.01); *H04L 67/2804* (2013.01); *H04W 4/70* (2018.02)

(58) Field of Classification Search
None
See application file for complete search history.

(56) References Cited

U.S. PATENT DOCUMENTS

2011/0016050 A1\* 1/2011 Evans ............... G06Q 20/10
705/44
2014/0136620 A1\* 5/2014 Son ................... H04L 67/2823
709/204

(Continued)

FOREIGN PATENT DOCUMENTS

WO    2016/077523 A1    5/2016

OTHER PUBLICATIONS

OneM2M Functional Architecture, oneM2M-TS-0001 oneM2M Functional Architecture -V3.7.0.
(Continued)

*Primary Examiner* — Dhairya A Patel
(74) *Attorney, Agent, or Firm* — BakerHostetler

(57) ABSTRACT

The concept of a service layer message template is introduced, which may be a request template or a response template. Message templates may be created and stored at the service layer. Each message template may contain a set of request or response parameters and their values. Once in place, an application can send a request to the service layer that does not include the request parameters contained in the message template (i.e. request template); instead, a message template identifier may be sent. Since request parameters are included in the message template and stored at the service layer, communication overhead between the service layer and the application (or another service layer) may be reduced.

9 Claims, 36 Drawing Sheets

(56) References Cited

U.S. PATENT DOCUMENTS

| | | |
|---|---|---|
| 2016/0050128 A1 | 2/2016 | Schaible et al. |
| 2016/0294748 A1* | 10/2016 | Yang .................. G06Q 50/01 |
| 2017/0180320 A1* | 6/2017 | Nimmagadda ....... G06F 21/604 |
| 2018/0287973 A1* | 10/2018 | Lee ...................... H04L 51/063 |
| 2022/0029994 A1* | 1/2022 | Choyi ................... H04W 4/70 |
| 2022/0046677 A1* | 2/2022 | Talarico ............ H04W 72/1284 |

OTHER PUBLICATIONS

Tarik et al., "An Efficient Scheme for MTC Overload Control Based on Signaling Message Compression" 2013 IEEE Global Communications Conference (GLOBECOM), IEEE, Dec. 9, 2013, pp. 342-346.

* cited by examiner

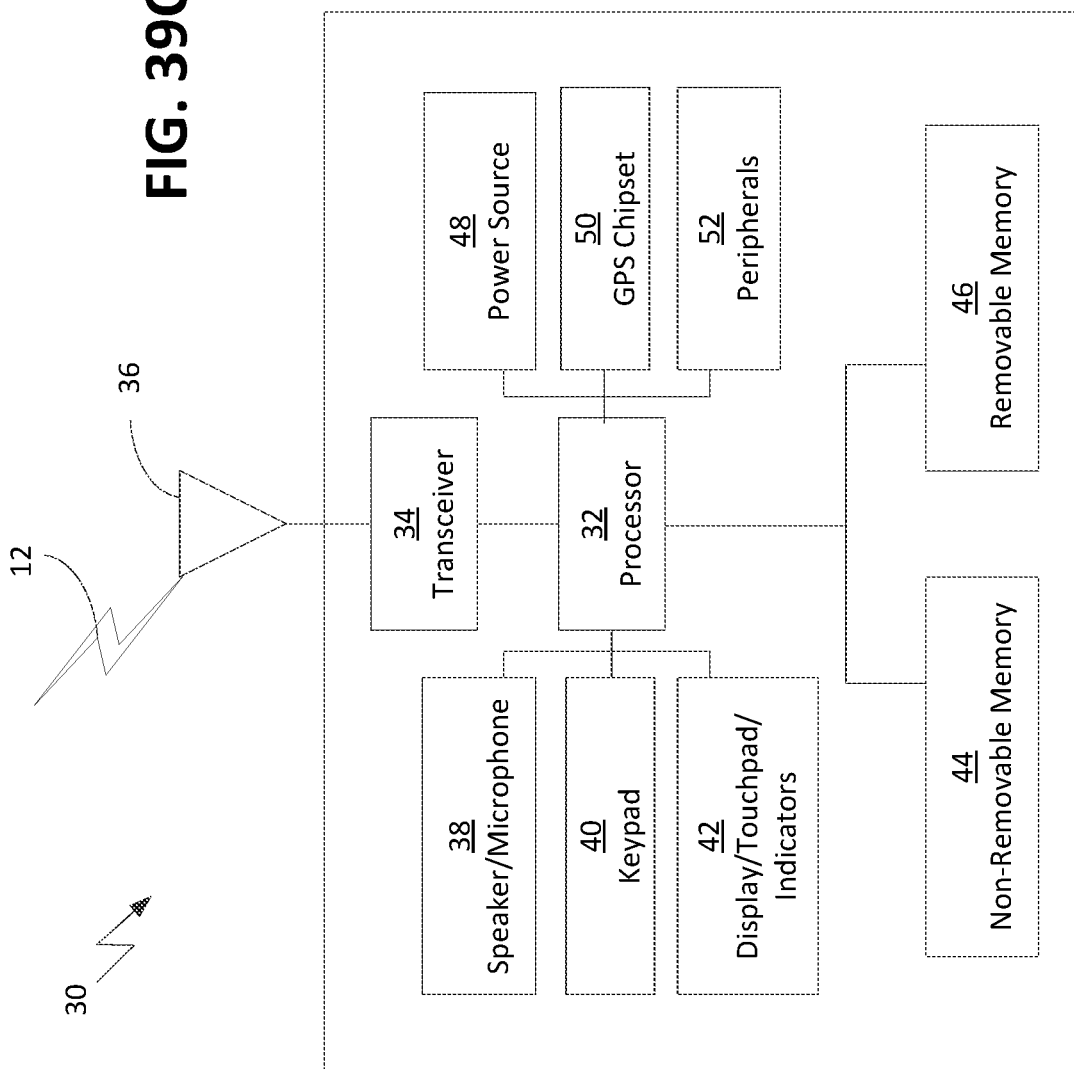

SERVICE LAYER MESSAGE TEMPLATES IN A COMMUNICATIONS NETWORK

CROSS-REFERENCE TO RELATED APPLICATIONS

This application is the National Stage Application of International Patent Application No. PCT/US2018/051037, filed Sep. 14, 2018, which claims the benefit of U.S. Provisional Patent Application No. 62/558,940, filed Sep. 15, 2017, which is hereby incorporated by reference in its entirety.

BACKGROUND

A number of standards bodies, such as, for example, oneM2M, the European Telecommunications Standards Institute (ETSI), and the Open Connectivity Foundation (OCF), are developing M2M/IoT service layers that define a single horizontal platform for the exchange and sharing of data among applications, even those from different industry sectors.

An M2M/IoT service layer may provide applications and devices access to a collection of M2M/IoT-oriented capabilities (M2M/IoT services) supported by the service layer. Such capabilities may be made available to applications via Application Programming Interfaces (APIs). For example, an M2M/IoT service layer may maintain massive amounts of M2M/IoT data, which may be discovered, retrieved, and/or subscribed-to by applications (provided those applications have suitable access rights). Additional examples of M2M/IoT services that may be provided by the service layer include security, charging, device management, provisioning, and connectivity management.

The oneM2M standard implements its service layer in the form of a "Common Service Entity (CSE)." The purpose of the oneM2M service layer is to provide "horizontal" services that can be utilized by different "vertical" M2M systems and applications. The oneM2M CSE supports four reference points. The Mca reference point interfaces with an Application Entity (AE). The Mcc reference point interfaces with another CSE within the same service provider domain and the Mcc' reference point interfaces with another CSE in a different service provider domain. The Mcn reference point interfaces with an underlying network service entity (NSE). An NSE provides underlying network services to the CSEs, such as device management, location services and device triggering. A CSE may contain multiple logical functions called "Common Service Functions (CSFs)", such as "Discovery" and "Data Management & Repository."

In oneM2M, a request/response model has been adopted for its Mca, Mcc, and Mcc' reference points. For example, an AE can send a request message to a CSE to access its resources or services. oneM2M provides several advanced features for processing the request message and generating a corresponding response message in accordance with various parameters. In addition, each response message may contain various response parameters. These parameters may be repeated in multiple request and response messages, potentially resulting in request/response messages of large size.

SUMMARY

As described in the Background, a service layer request message may contain a set of request parameters, which increases the size of request messages and decreases the communication efficiency between a service layer and an application (or another service layer). Similarly, a service layer response message may contain multiple response parameters which in turn enlarge the response message. In addition, request messages from the same or different applications may contain the same request parameters with the same values, which are redundant. Also, response messages from the service layer to a requestor could contain redundant response parameters as well. In particular, in an IoT service layer, request messages could become large due to too many request parameters and unavoidably introduce high overhead and become cumbersome to manage when the underlying networks have limited communication capacity, such as 3GPP narrow-band IoT and other low-power wide-area networking technologies.

Described herein are methods and apparatus that improve communication efficiency between a service layer and applications (or another service layer) caused by large request and response messages, in terms of communication overhead and other related metrics, especially for underlying networks with limited bandwidth such as low-power wide-area networks.

According to one aspect, a service layer message template may be employed, which may comprise a request template or a response template. Message templates may be created and stored at the service layer. Each message template may contain a set of request or response parameters and their values. Once in place, an application can send a request to the service layer that does not include the request parameters contained in the message template (i.e. request template); instead, a message template identifier may be sent. Since request parameters are included in the message template and stored at the service layer, communication overhead between the service layer and the application (or another service layer) may be reduced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 39C is a system diagram of an example communication network apparatus, such as an M2M/IoT/WoT device, gateway, or server that may be used within the communications system illustrated in FIGS. 39A and 39B.

DETAILED DESCRIPTION OF ILLUSTRATIVE EMBODIMENTS

Figure 1:
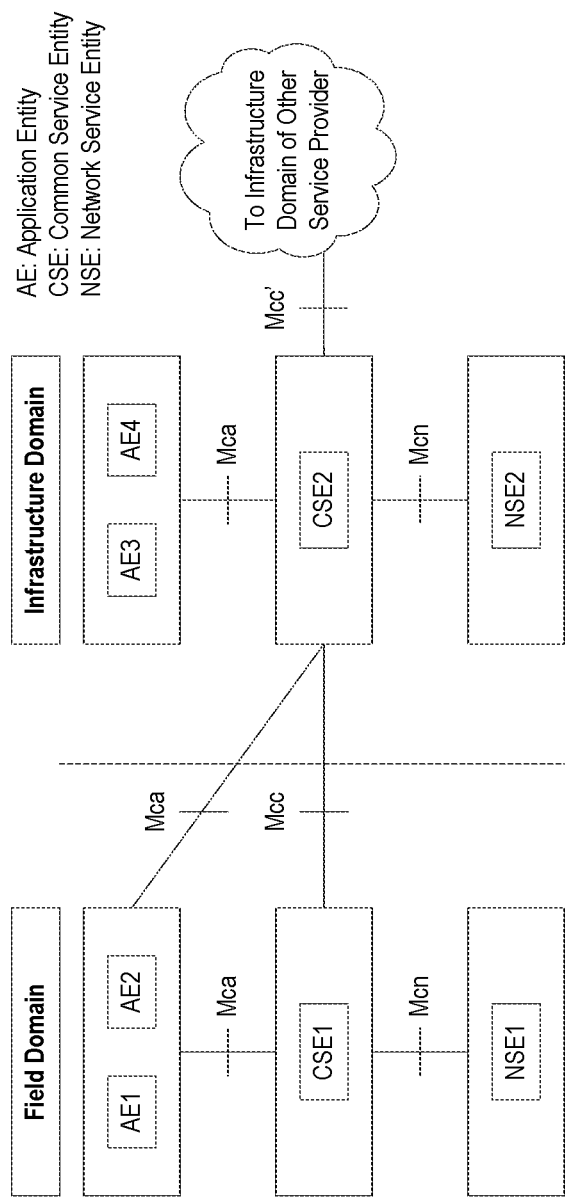
FIG. 1 is a diagram illustrating the network architecture specified by oneM2M.

The oneM2M standard implements a service layer in the form of a "Common Service Entity (CSE)". The purpose of the oneM2M service layer is to provide "horizontal" services that can be utilized by different "vertical" M2M systems and applications. The CSE supports four reference points as shown in FIG. 1. The Mca reference point interfaces with an Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services and device triggering. A CSE contains multiple logical functions called "Common Service Functions (CSFs)", such as "Discovery" and "Data Management & Repository".

The oneM2M architecture enables the following types of Nodes, as shown in FIG. 1: an Application Service Node, an Application Dedicated Node, a Middle Node, an Infrastructure Node, and a Non-oneM2M Node.

An Application Service Node (ASN) is a node that contains one CSE and contains at least one Application Entity (AE). As an example of a physical mapping, an ASN could reside in an M2M device, such as a sensor or the like.

An Application Dedicated Node (ADN) is a node that contains at least one AE and does not contain a CSE. There may be zero or more ADNs in the Field Domain of the oneM2M System. As an example of a physical mapping, an ADN could reside in a constrained M2M device.

A Middle Node (MN) is a node that contains one CSE and contains zero or more AEs. There may be zero or more MNs in the Field Domain of the oneM2M System. As an example of physical mapping, a MN could reside in an M2M gateway.

An Infrastructure Node (IN) is node that contains one CSE and contains zero or more AEs. There is exactly one IN in the Infrastructure Domain per oneM2M Service Provider. A CSE in an IN may contain CSE functions not applicable to other node types. As an example of a physical mapping, an IN could reside in an M2M service infrastructure.

A Non-oneM2M Node (NoDN) is a node that does not contain oneM2M Entities (neither AEs nor CSEs). Such nodes represent devices attached to the oneM2M system for interworking purposes, including management.

In oneM2M, a request/response model has been adopted for its Mca, Mcc, and Mcc' reference points. For example, an AE can send a request message to a CSE to access its resources or services. oneM2M provides several advanced features for processing the request message and generating a corresponding response message via some new parameters as described in Table 1. In addition, each response message contains some response parameters as listed in Table 2. Note that these parameters could be repeated in multiple request and response messages and could result in a oneM2M request or response message of a large size.

TABLE 1

Summary of Request Parameters in oneM2M (adapted from oneM2M-TS-0001 oneM2M Functional Architecture -V3.7.0)
Request message parameter

| | |
|---|---|
| Mandatory | Operation - operation to be executed |
| | To - the address of the target resource on the target CSE |
| | From - the identifier of the message Originator |
| | Request Identifier - uniquely identifies a Request message |
| Operation dependent | Content - to be transferred |
| | Resource Type - of resource to be created |
| Optional | Originating Timestamp - when the message was built |
| | Request Expiration Timestamp - when the request message expires |
| | Result Expiration Timestamp - when the result message expires |
| | Operational Execution Time - the time when the specified operation is to be executed by the target CSE |
| | Response Type - type of response that shall be sent to the Originator |
| | Result Persistence - the duration for which the reference containing the responses is to persist |
| | Result Content - the expected components of the result |
| | Event Category - indicates how and when the system should deliver the message |
| | Delivery Aggregation - aggregation of requests to the same target CSE is to be used |
| | Group Request Identifier - Identifier added to the group request that is to be fanned out to each member of the group |
| | Filter Criteria - conditions for filtered retrieve operation |
| | Discovery Result Type - format of information returned for Discovery operation |
| | Security Info - information about the Content if it contains security parameters |
| | Token Request Indicator - indicating that the Originator may attempt Token Request procedure (for Dynamic Authorization) if initiated by the Receiver |
| | Tokens - for use in dynamic authorization |
| | Token IDs - for use in dynamic authorization |
| | Role IDs - for use in role based access control |
| | Local Token IDs - for use in dynamic authorization |

TABLE 2

Figure 2:
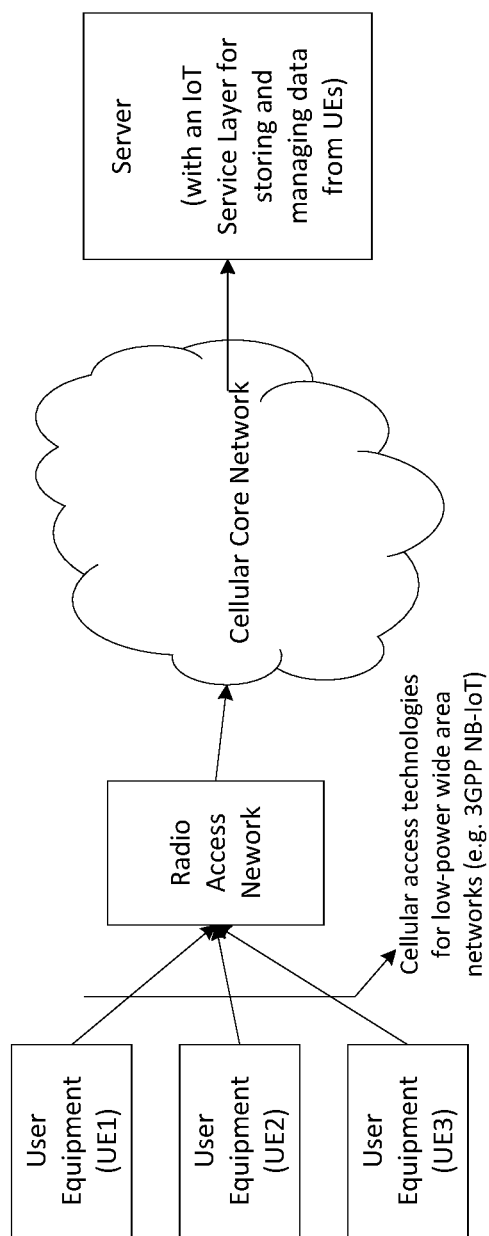
FIG. 2 illustrates a smart metering use case, where each smart meter, as a User Equipment (UE), uses low-power wide-area access technologies such as 3GPP Narrow-Band Internet of Things (NB-IoT) to communicate with a server.

Summary of Response Parameters in oneM2M (adapted from oneM2M-TS-0001 oneM2M Functional Architecture -V3.7.0)
Response message parameter/success or not Response Status Code - successful, unsuccessful, ack
Request Identifier - uniquely identifies a Request message
Content - to be transferred
To - the identifier of the Originator or the Transit CSE that sent the corresponding non-blocking request
From - the identifier of the Receiver
Originating Timestamp - when the message was built
Result Expiration Timestamp - when the message expires
Event Category - what event category shall be used for the response message
Security Info - information about the Content if it contains security protocols To better understand the technical problem to which the technical solution described herein is addressed, a use case is presented for illustration. FIG. 2 illustrates a smart metering use case, where each smart meter, as a User Equipment (UE), uses low-power wide-area access technologies such as 3GPP Narrow-Band Internet of Things (NB-IoT) to communicate with a server where an IoT service layer resides for storing and managing meter data from various UEs; the Server could be deployed by an electricity company. For example, there could be a smart meter application running on each UE to periodically send meter readings to the Server. In addition, multiple smart meters (e.g. deployed in the same community) may report their readings to the Server in the same way (e.g. reporting frequency, how request messages shall be processed by the Server, etc.). As such, each smart meter may repeatedly send similar request messages to the server, and multiple meters may also send similar request messages to the Server at different times. These two aspects are abstracted and discussed furthermore in connection with FIGS. 3 and 4.

Figure 3:
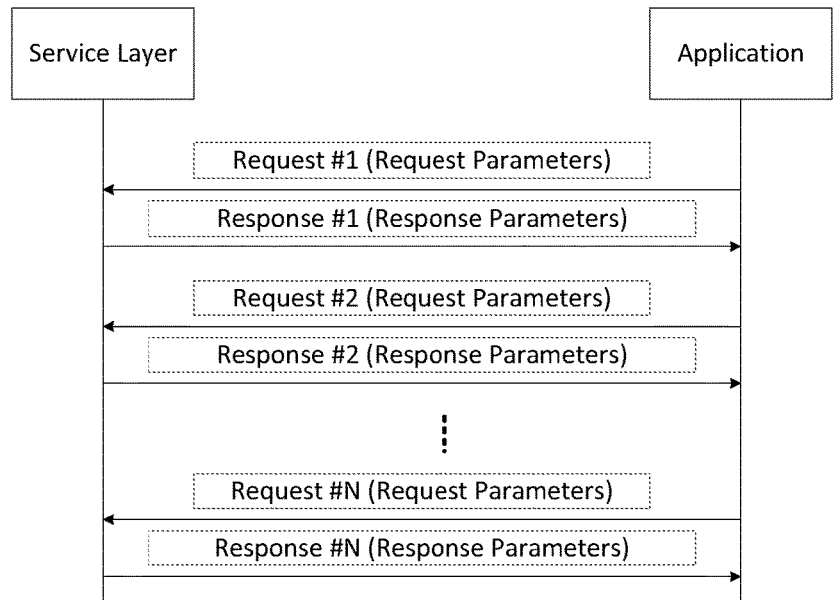
FIG. 3 illustrates interactions between an application and a service layer.

FIG. 3 illustrates interactions between an application and a service layer. In this example, the application (e.g. smart meter application on a smart meter in FIG. 2) repeatedly sends request messages to the service layer. Each request message contains a set of request parameters; likewise, the corresponding response message contains response parameters. In addition, the application may request the same services/resources from the service layer during certain time durations; thus, each repeated request message includes the same set of request parameters.

Figure 4:
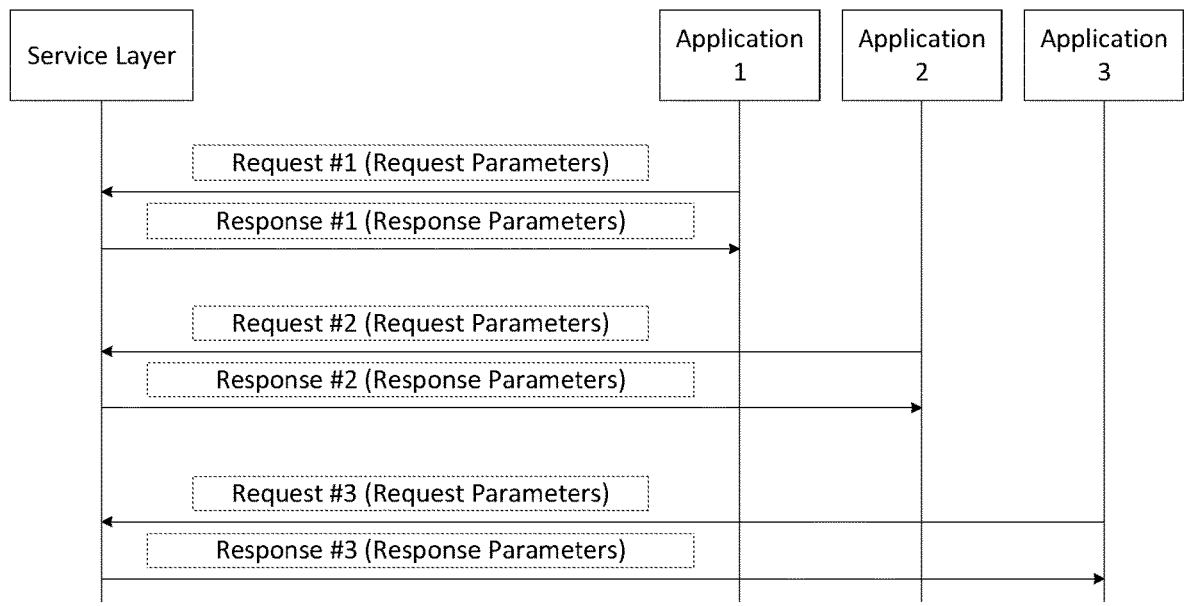
FIG. 4 shows an example in which multiple applications (e.g. smart meter applications on smart meters in FIG. 2) interact with the same service layer.

FIG. 4 shows another example, where multiple applications (e.g. smart meter applications on smart meters in FIG. 2) interact with the same service layer. In this scenario, although three (or more) applications could access different service/resources, they may instruct the service layer to process their request messages in the same way. For example, they may indicate to the service layer: the same request message expiration time, the same result expiration time, etc. Therefore, the request message from each application may contain the same set of request parameters.

Before proceeding with the technical solution to the problem illustrated by the foregoing use case, certain terms are defined herein for ease of description only. The following terms may have the following meanings:

A Service Layer may be described as a protocol layer between applications and application protocol layers. A service layer stores resources and provides services, which are exposed to and can be accessed and manipulated by applications and other service layers.

A Request/Response Model may be an interaction model between a service layer and an application (or between two service layers). In this model, the application (or another service layer) sends a request message to the service layer, which in turn sends a response message back to the application (or another service layer).

A Request Message may be a message sent from an application (or another service layer) to a service layer to request services provided by the service layer. The service layer processes a received request message and will sends a response message to the originator of the request message. A request message could be also issued from a service layer to another application.

Request Parameters may be parameters included in a request message which instructs the service layer when/how to process the request message, how to maintain the generated result, when/how to send back a response message, etc.

A Response Message may be a message sent from the service layer to an application (or another service layer) as a result of receiving and processing a request message. A response message could be also issued from an application to a service layer.

Response Parameters may be parameters included in a response message. For example, when a requestor requests to retrieve a resource from a service layer, the response message generated by the service layer may include a "content" parameter to include the representation of the retrieved resource.

A Message Template (MT) may be a request template for describing request messages or a response template for describing response messages. Request templates are stored in memory at the service layer and/or on the requestor side and can be discovered and retrieved by applications; response templates may also be stored at the service layer and/or the requestor side. Message templates can be managed by the service layer, applications, and/or other service layers. An MT may take the form of any suitable data structure that holds the parameter values of the template, such as a table, an extensible mark-up language (XML) document, or any other suitable machine-readable data structure or document.

A Request Template (REQT) contains some common request parameters and their values for a given message that are repeatedly used in requests. An application or another service layer can leverage a request message template to generate an optimized request where commonly used subset of request parameters can be omitted once they are included in the template.

A Response Template (RSPT) describes how a response message should be generated and what the response message looks like. A response template can be associated with a request template or a request; as such, when a service layer uses the request template to process a received optimized request, it knows which response template should be used to generate the response message. In addition, the service layer may create a response template at the requestor side to contain response parameters which will be repeatedly transmitted from the service layer to the requestor; the service layer can use this kind of response template to generate optimized response by omitting those repeated response parameters; the requestor stores this kind of response template locally and can use it to recover original response message from the received optimized response. Note that a response template could be used to reply to a request that does, or does not, include a request template.

A Message Template Identifier (MTID) may be a universal resource identifier, or a numerical identifier, of a message template stored at the service layer, which could be a request template or a response template.

A Request Template Identifier (RQTID) may be a universal resource identifier, or a numerical identifier, of a request template stored at the service layer.

A Response Template Identifier (RSTID) may be a universal resource identifier, or a numerical identifier, of a response template stored at the service layer.

Message Template Management may comprise tasks for creating a message template, retrieving the message template, leveraging the message template, updating the message template, deleting the message template, associating a message template with one or more message template policies, etc.

A Message Template Policy may comprise conditions for describing or limiting the applicability of message templates (e.g. whether/when to apply which message template to which requestor for which target resource).

A Regular Request may be a request message natively defined and supported in a service layer or application layer. The regular request used to contain a set of request parameters as specified by the service layer. A regular request does not leverage any request template.

An Optimized Request may be a request message enhanced by leveraging a request template. In general, an optimized request is formulated at the requestor side by containing a request template identifier and removing those request parameters which are included in the request template. Thus, the optimized request is shorter than the regular request.

A Regular Response may be a response message natively defined and supported in a service layer or application layer. The regular response used to contain a set of response parameters as specified by the service layer. A regular response does not leverage any response template stored at the requestor side.

An Optimized Response may be a response message enhanced by leveraging a response template. In general, an optimized response is formulated at the service layer side by containing a response template identifier and removing those response parameters which are included in the response template. Thus, the optimized response is shorter than the regular response.

For the remainder of this description, a message template may refer to either a request template or a response template unless explicitly stated. Likewise, a message template identifier (MTID) may refer to either a request template identifier (RQTID) or a response template identifier (RSTID) unless explicitly stated.

In the description that follows, mechanisms for leveraging message templates are described. Then, an overall procedure for message template management will be described, followed by a description of embodiments of each message template management task that may be performed, such as message template creation, message template assignment and discovery, message template retrieval, message template usage, message template update, message template deletion.

For ease of description only, in the description that follows, request messages are described as being issued from an application (or another service layer) to a service layer. But the concepts, mechanisms, and embodiments described herein can be directly applied to a scenario where a service layer sends request messages to an application and accordingly response messages are from the application to the service layer.

Figure 5:
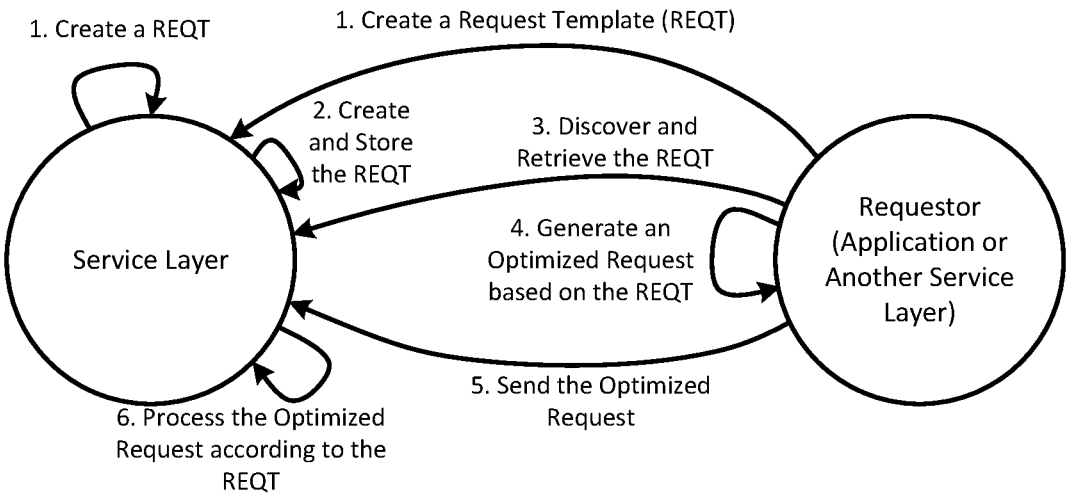
FIG. 5 illustrates one embodiment of methods for leveraging request templates to optimize service layer request messages in terms of reducing their size.

FIG. 5 illustrates one embodiment of methods for leveraging request templates to optimize service layer request messages in terms of reducing their size. Note that the requestor in FIG. 5 could be an application or another service layer; in addition, each step could involve several sub-steps, which will be detailed in the description that follows. Note that request parameters contained in a request template may not be in any particular order.

With reference to FIG. 5, in step 1, the requestor requests to create a Request Template (REQT). Alternatively, the service layer can proactively create some REQTs. The request may include default values to be used for information elements that would normally appear in the request. The REQT may be built based on these default values. When the REQT is later used by e a requestor, the default values may be assumed by the service layer if different values are not provided in a request that indicates that the REQT will be used.

In step 2, the service layer creates the REQT, an REQT identifier, and stores them locally in a memory of the network apparatus on which the service layer is implemented.

In step 3, for a requestor that is not the creator of the REQT to be able to leverage the created REQT, the requestor needs to know its content (e.g. which request parameters have been included in the REQT) in order to optimize future request messages to be sent to the service layer. As such, the requestor needs to discover and retrieve the REQT and its associated identifier. Alternatively, and not shown in the figure, the service layer can actively assign one or more REQTs to the requestor.

In step 4, after retrieving the REQT or being assigned or notified of the REQT, the requestor uses it to generate an optimized request, which will include the identifier of the REQT and exclude those parameters already contained in the REQT. For any request parameters not included in the REQT, the requestor still needs to include them in the optimized request. Since the optimized request contains less parameters than a regular request, its size is reduced and communication overhead with the service layer will be decreased as well.

In step 5, the requestor sends the optimized request to the service layer. Note that the optimized request contains the identifier of the REQT which has been used to generate the optimized request in step 4. The request may also provide values for information elements that were part of the REQT. The presence of the values may be used by the requestor to indicate that the default values on the REQT should be overridden with the provided values.

In step 6, the service layer receives the optimized request and processes it according to the REQT. Specifically, the service layer first uses the REQT identifier contained in the optimized request to locate the appropriate REQT; then, it uses the request parameters and other information contained in the REQT together with other parameters/information in the optimized request to process the received optimized request in the way it is supposed to use to process a regular request. Then, the service layer generates a regular response and sends it back to the requestor if the service layer does not support response templates; if the response template is supported, the service layer may leverage a response template to generate optimized responses (see FIG. 5).

Note that, although the overall procedure that is shown in FIG. 5 results in more messaging for creating/discovering/retrieving request templates between the service layer and the requestor (compared to a single request/response without a message template) great savings may be achieved if the requestor will be repeatedly sending the same type of request to the service layer and/or the message template will be used by multiple requestors. This is because all subsequent requests (or requests from multiple requestors) may take advantage of the REQT.

Figure 6:
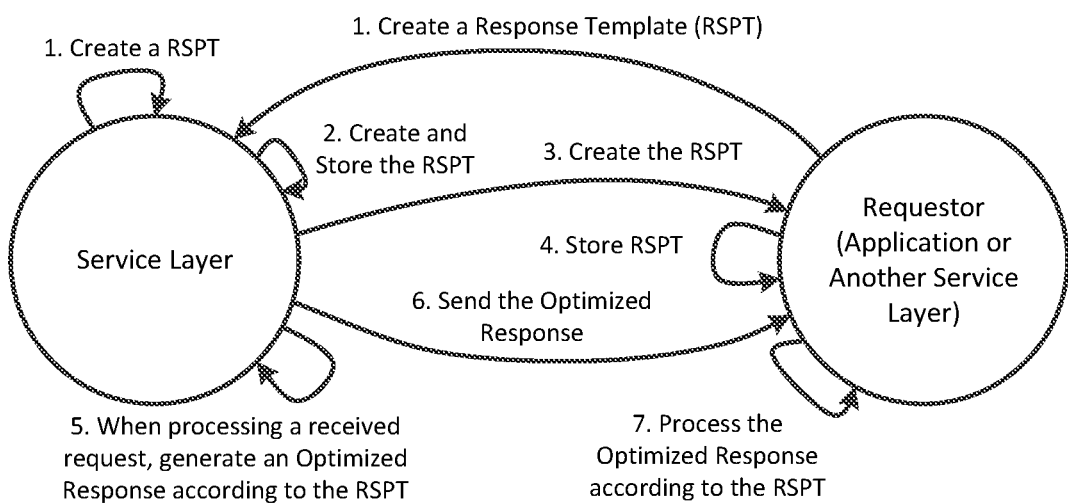
FIG. 6 illustrates one embodiment of methods for leveraging response templates to optimize service layer response messages in terms of reducing their size.

FIG. 6 illustrates one embodiment of methods for leveraging response templates to optimize service layer response messages in terms of reducing their size. Note that the requestor in FIG. 6 could be an application or another service layer; in addition, each step in FIG. 6 could involve several sub-steps. Note that response parameters contained in a response template may not be in any particular order.

With reference to FIG. 6, in step 1, the requestor requests to create a Response Template (RSPT). Alternatively, the service layer can also initiate to create some RSPTs. The request from the requestor may provide response parameters, a RSPT identifier, or a complete response that should be used to build the RSPT. For example, the requestor may indicate what response parameters should be assumed when building the RSPT.

In step 2, the service layer creates the RSPT, an RSPT identifier, and stores them locally in a memory of the network apparatus on which the service layer is implemented.

In step 3, the service layer sends the same RSPT and identifier at the requestor so that the requestor can use it to correctly process any optimized response to be received in the future.

In step 4, the requestor stores the RSPT locally.

In step 5, the service layer, when processing a received request, generates an optimized response according to the RSPT which has been known by the requestor. The optimized response may include the identifier of the RSPT that was used. Compared to a regular response, the optimized response excludes those parameters/information already included in the RSPT and the message size will be reduced. Note that the received request which is issued by the requestor can explicitly request the service layer to create and/or use a particular RSPT when it sends the request to the service layer; the request to use a RSPT may be indicated by including a RSPT identifier or a "USE RSPT" flag in the request message.

In step 6, the service layer sends the optimized response to the requestor. The optimized response includes the RSPT identifier. The optimized response omits those response parameters included in the RSPT, but contains the RSPT identifier. In order to override the values that were defined in the RSPT, the response may include values for some of the parameters that were assigned default values in the RSPT.

In step 7, the requestor receives the optimized response, uses the RSPT identifier to locate the corresponding RSPT, and uses the response parameters and information contained in the RSPT to process the optimized response.

Methods for message template management will now be described. In accordance with one aspect, a requestor (i.e. an application or another service layer) can initiate the creation of a message template at a service layer. Once the message template is created, it can be assigned to or discovered by the same or other requestors. After a requestor discovers or is assigned an appropriate message template, it can use it to generate optimized requests (or responses) where some request (or response) parameters will be omitted and replaced by a message template identifier. Then, the message template can be manipulated in a RESTful manner (i.e. retrieve a message template, update a message template, and delete a message template).

Figure 7:
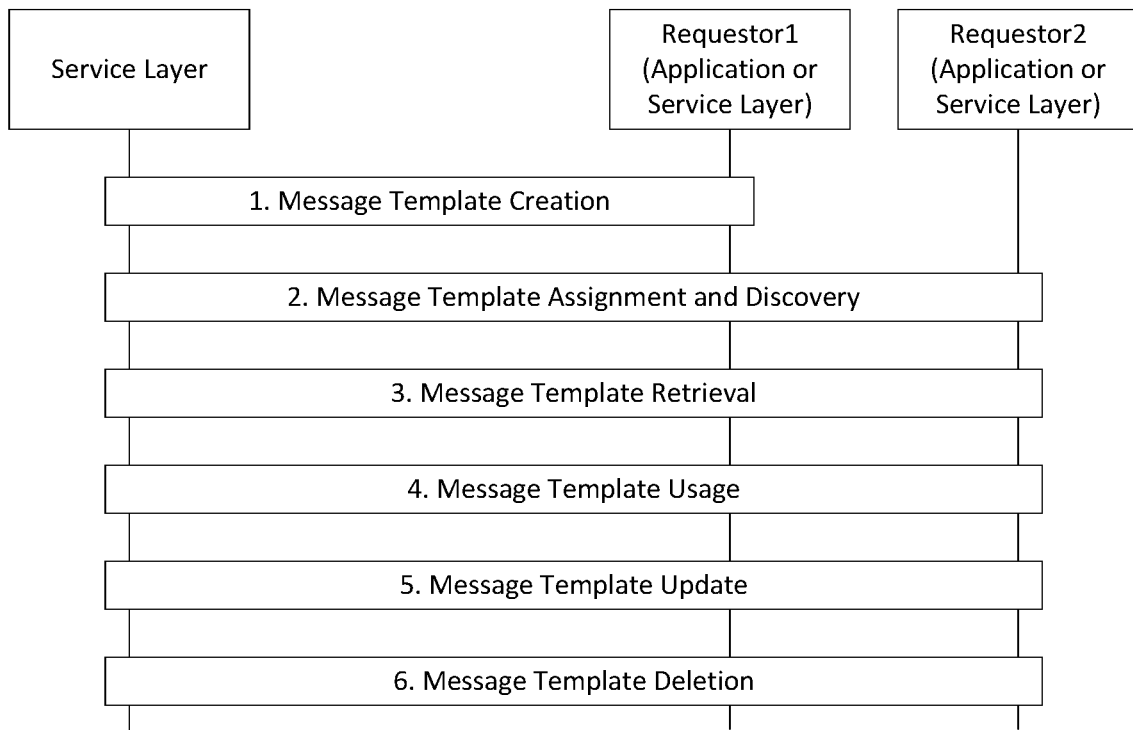
FIG. 7 illustrates an overall method for message template management.

FIG. 7 illustrates an overall method for message template management which is based on and consistent with what has been described in relation to FIG. 5 and FIG. 6. One of concept illustrated in FIG. 7 is that the message template created by a requestor or a service layer may be assigned to, discovered by, and/or used by other requestors.

With reference to FIG. 7, in step 1, a message template is created and stored at the service layer; this may be initiated by requestor1 or by the service layer itself. The message template may be created as described in FIG. 5 and FIG. 6.

In step 2, the created message template is assigned to and/or discovered by requestor2 (or the requestor1 as well). Note that the service layer can assign a message template created by requestor1 to requestor2 (and vice versa although that is not shown in the figure). Note that after discovering or being assigned with a message template, requestor2 (or requestor1) can make a subscription to the message template in order to receive automatic notifications when the message template is updated (in step 5) or deleted (in step 6). Here, for a requestor being assigned with a message template, it means: 1) the message template and its identifier are given to the requestor; 2) the requestor is authorized to and/or constrained to use the assigned message template to generate optimized requests if it is a request template, or generate regular responses from optimized responses if it is a response template.

In step 3, Requestor2 (or requestor1) retrieves the message template from the service layer.

In step 4, Requestor2 (or requestor1) uses the message template (i.e. request template) to generate optimized requests and interacts with the service layer. Note that multiple templates could be jointly leveraged to generate an optimized request. When the service layer receives an optimized request, it locates the corresponding template and uses it to process the optimized request. In this process, when requestor2 (or requestor1) sends a request message to the service layer, it can indicate and instruct the service layer to create a response template and/or use a response template to generate an optimized response to requestor2 (or requestor1).

In step 5, the message template can be updated by requestor2 (or requestor1) or the service layer itself. For example, parameters or information contained in a message template can be updated. If the updated message template has been used and/or subscribed by multiple requestors, the service layer will send a notification to those requestors and inform them of the updates.

In step 6, the message template can be deleted by requestor2 (or requestor1) or the service layer itself. If the deleted message template has been used or subscribed by multiple requestors, the service layer will send a notification to those requestors and inform them of the removal of the message template.

In one aspect, a requestor may actively initiate the creation of a request template by sending a request message to a service layer. Before this step, the requestor may have discovered that the service layer supports message template functions, for instance, via service discovery; to enable this, the service layer needs to expose/announce its message template functions so that they can be discovered by the requestor. There are two cases for the requestor to send the request template creation request to the service layer. In Case1, the requestor sends a dedicated request template creation request to the service layer; this request will contain some request parameters including their values as needed. In Case2, the requestor piggybacks a Request Template Creation Indicator (RQTCI) in a regular request; the RQTCI informs the service layer how to create a request template (e.g. which request parameters and their values shall be included in the message template to be created). The service layer creates a request template according to what the RQTCI specifies.

Figure 8:
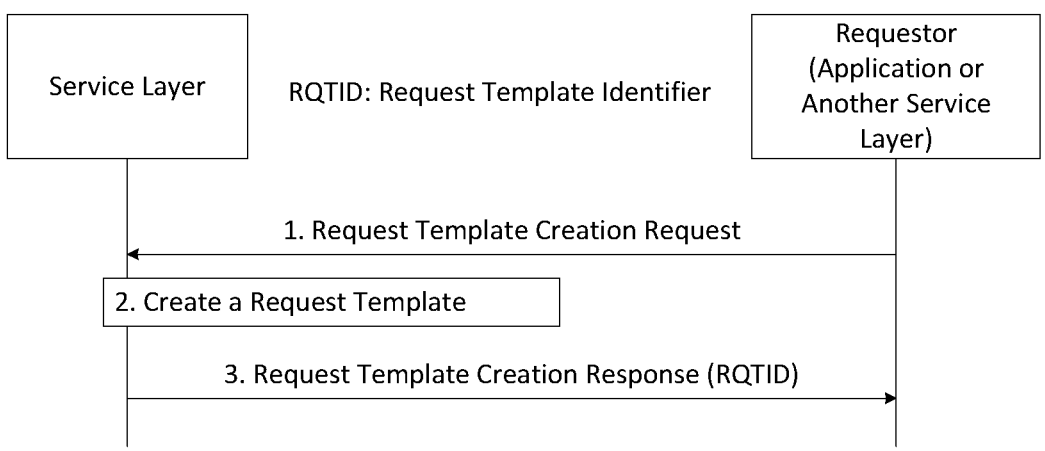
FIG. 8 illustrates a method for request template creation initiated by the requestor using an independent request.

FIG. 8 illustrates a method for request template creation initiated by the requestor using an independent request. In step 1, the requestor sends a Request Template Creation Request to the service layer to instruct the service layer to create a request template. This message may contain the following parameters.

Figure 9:
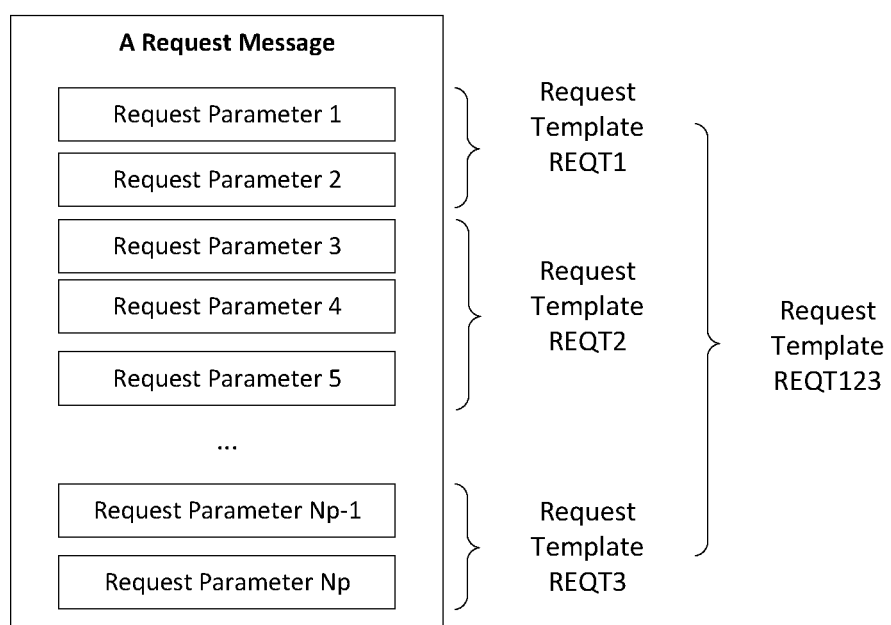
FIG. 9 is a diagram illustrating an example in connection with the method of FIG. 8.

- templateType: indicates the type of message template to be created is a request template.
- numOfRequestTemplatesToBeCreated (Nt): indicates the number of request templates to be created. The requestor can ask for creating multiple request templates; in this case, request parameters to be included in each template are contained in listOfRequestParameters.
- listOfRequestParameters: indicates a list of request parameters including their values which will be included in the request template to be created. Usually, these parameters and their values will be repeatedly used in future requests. As such, by creating a request template to include them, they can be omitted in future requests and in turn reduce the size of future requests. In case numOfRequestTemplateToBeCreated is more than one (i.e. Nt>1), listOfRequestParameters should divide all included parameters into Nt sub-groups and parameters in each sub-group will be used to create a separate request template. As shown in FIG. 9, assume there are originally Np (e.g. Np=15) request parameters in a request message and Nt=3. In this example, listOfRequestParameters will contain three sub-groups of parameters. The first sub-group includes two request parameters and will be used to create the first request template REQT1, the second sub-group includes next three request parameters and will be used to create the second request template REQT2, and the third sub-group includes the last two parameters and will be used to create the third request template REQT3. Note that some request parameters will not be included or used in a request template as FIG. 8 shows. Taking oneM2M as an example, some request parameters shown in Table 1 can be contained in a request template: Operation, Request Expiration Timestamp, Result Expiration Timestamp, Operational Execution Time, Response Type, Result Persistence, Result Content, Event Category, Delivery Aggregation, Group Request Identifier, Filter Criteria, Discovery Result Type, Security Info, etc.
- listOfExistingRequestTemplateIDs: indicates a list of existing request template identifiers already created and stored at the service layer. This parameter is used to create a new request template based on existing request templates so that the requestor does not need to indicate request parameters but only the identifiers of existing request templates. If this parameter is contained in step 1, the request template to be created will be based on these existing request templates plus any parameters indicated in the listOfRequestParameters. In other words, the request template to be created will include all request parameters contained in those existing request templates and in the listOfRequestParameters for the case Nt=1. Still using FIG. 9 as an example, if listOfExistingRequestTemplateIDs contains three request templates REQT1, REQT2, and REQT3 as shown in FIG. 9, the service layer will create a new request template REQT123, which can only contain the identifiers of these three existing request templates and essentially contain all request parameters from REQT1, REQT2, and REQT3. By creating such a new request template, the service layer offers more flexibility and higher efficiency for requestors to leverage or reuse existing request templates. For example, a requestor later can simply use the request template REQT123 to generate an optimized request and only needs to tell the service layer of the identifier of REQT123; otherwise if not using such a new template, the requestor needs to use REQT1, REQT2, and REQT3 together to generate the same optimized request and needs to inform the service layer of three identifiers (respectively for REQT1, REQT2, and REQT3). If numOfRequestTemplatesToBeCreated is more than one (i.e. Nt>1), similar to how listOfRequestParameters divides request parameters to several sub-groups, listOfExistingRequestTemplateIDs should divide all included template identifiers into Nt sub-groups and template identifiers in each sub-group will be used to create a separate request template.

listOfAllowedRequestors: indicates a list of requestors which can leverage the request templates to be created in step 2. This parameter is optional.

listOfTargetResources: indicates a list of target resources which the request templates to be created in step 2 can be applied to. This parameter is optional.

MTPList: indicates a list of existing message template policies which will apply to the request template being created. This parameter is optional. If this parameter is included, listOfAllowedRequestors and listOfTargetResources may not be needed.

Still referring to FIG. 8, in step 2, the service layer receives the Request Template Creation Request from step 1 and processes it to generate corresponding request templates as required by the requestor. The service layer may check if the same template has been previously created; if yes, it may not create a new one. The created request template may have some request parameters and other properties (e.g. creation, expiration time, list of allowed requestors, list of target resources, list of other request templates as child, etc.). Note that, in one embodiment, if numOfRequestTemplatesToBeCreated is equal to 1 (i.e. Nt=1), the service layer simply uses all request parameters contained in listOfRequestParameters and any existing request templates indicated in listOfExistingRequestTemplateIDs to create a new request template. The service layer assigns an identifier for the created request template. Note also that, in one embodiment, if numOfRequestTemplatesToBeCreated is more than 1 (i.e. Nt>1), the service layer shall create Nt request templates. Each request template to be created shall be based on the request parameters included in a sub-group in listOfRequestParameters and any existing template identifiers included in a sub-group listOfExistingRequestTemplateIDs. The service layer assigns an identifier for each created request template. Once created, the request template(s), which may comprise any suitable data structure for containing the parameter values of the template, may be stored in a memory of the network apparatus (e.g., server, gateway, device) implementing the service layer.

A request template may be implemented in any suitable form of data structure, such as a table, an extensible mark-up language (XML) document, or any other suitable data structure or document. With reference to the smart metering use case above, the following illustrates an example of a template that may be created in the context of that use case, assuming a smart meter as an AE (i.e. meter AE123) periodically reporting its readings via creating a contentInstance resource at the server service layer (i.e. serverCSE) using oneM2M protocols. The request template shown below may be created at the server, which contains the following nine parameters although more request parameters could be contained in a request template dependent on the use case requirement:

1. The operation is to create a resource.
2. The originator or requestor is the smart meter, which has registered to the server as an application with an assigned identifier meterAE123.
3. The resource will be created under meterAE123's container meterContainer234.
4. The resource type to be created is contentInstance (i.e. each reported reading will be stored in a different contentInstance).
5. The Request Expiration Time is 1800 seconds. In other words, each received creation request from meterAE123 will be expired after 1800 seconds.
6. The Operation Execution Time is 600 seconds. In other words, the server needs to process the creation request from meterAE123 no later than 600 seconds.
7. The Response Type is non-Blocking synchronous case where the server will send an ACK to the smart meter immediately, followed by a response at a later time.
8. The Event Category for each received creation request is set to "best efforts" in case the server will forward the request to another CSE.
9. The Token Request Indicator is set to true which means that the smart meter supports the Token Request procedure, and the Originator may attempt the Token Request procedure if the Receiver provides a Token Request Information parameter in the response.

The following is an example of a template containing such values in XML format:

```
<?xml version="1.0" encoding="UTF-8"?>
<m2m:requestTemplate xmlns:m2m="http://www.onem2m.org/xml/protocols">
    <op>1</op>            <!-Operation (op) is to CREATE a resource>
    <to>//example.net/serverCSE/meterAE123/meterContainer234</to>
        <!-To (to) indicates where the new resource is to be created>
    <fr>meterAE123</fr>   <!-From (fr) indicates the originator ID (i.e. meterAE123)>
    <ty>4</ty>            <!-Resource Type (ty) to be created is contentInstance>
    <rqet>3600</rqet>     <!-Request Expiration Time (rqet) is 1800 seconds>
    <oet>600</oet>        <!-Operation Execution Time (oet) is 600 seconds>
    <rt>1</rt>            <!-Response Type (rt) is nonBlockingSync>
    <ec>3</ec>               <!-Event Category (ec) is best effort>
    <tqi>1</tqi>             <!-Token Request Indicator (tqi) is true>
</m2m:requestTemplate>.
```

Still referring to FIG. 8, in step 3, the service layer sends a Request Template Creation Response to the requestor. This message contains identifiers of all created request templates (i.e. a list of request template identifiers—RQTID).

Figure 10:
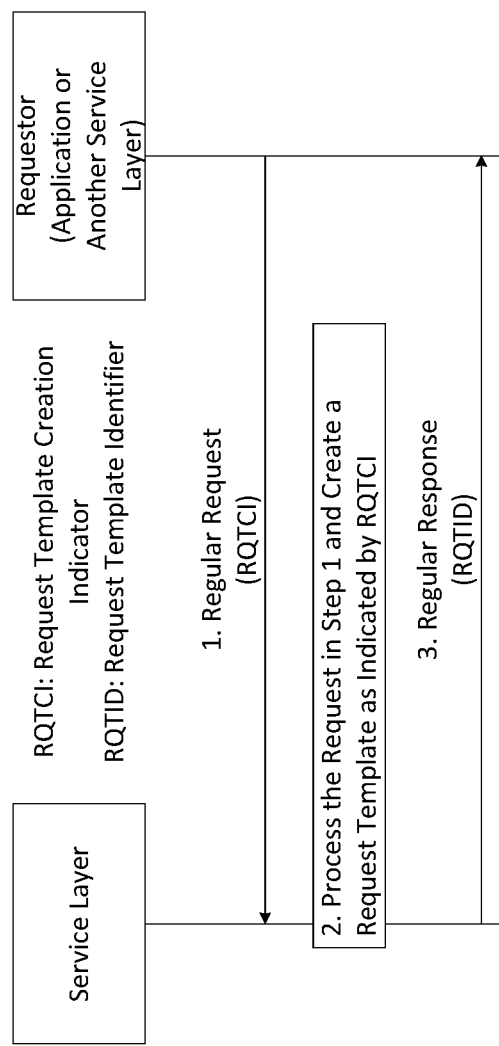
FIG. 10 illustrates a method for request template creation initiated by a requestor when sending a regular request.

FIG. 10 illustrates a method for request template creation initiated by a requestor when sending a regular request. In step 1, when the requestor sends a regular request to access a resource or service at the service layer, the requestor contains a new parameter Request Template Creation Indicator (RQTCI) in this message. RQTCI is used to instruct the service layer to additionally create request templates besides processing this regular request. RQTCI basically indicates all information as contained in step 1 in FIG. 8; the only exception is RQTCI does not need to contain request parameter values since they are already included in the regular request. Essentially, RQTCI serves as an indication that a template should be built based on the parameters that are contained in the request and are indicated/implied by RQTCI. When the requestor issues subsequent requests that are similar, it can use the template identifier instead of resending the same parameters again. Of course, parameters that need to be different in the subsequent request may be overridden by the requestor. Overridden means that the requestor may instructor the responder to use some values that are different than what is used in the template. Note that this request may contain MTPList to indicates a list of existing message template policies which will apply to the request template being created.

In step 2, The service layer processes the request received from step 1 and generates a regular response. Then, it creates request templates as indicated by RQTCI.

In step 3, The service layer sends the regular response to the requestor. Similar to step 3 in FIG. 8, the identifiers of request templates created in step 2 (i.e. RQTID) are included in this response message.

In another aspect, a service layer may actively initiate the creation of a request template while receiving regular requests from a requestor. When the service layer observes that multiple regular requests use similar request parameters, it can create a request template containing those request parameters. Then, the service layer needs to inform the requestor of the created request template so that the requestor can leverage it to reduce the size of regular requests and generate optimized requests; there are two cases for the service layer to perform this task. In Case1, the service layer sends a dedicated request template notification to the requestor; in Case2, the service layer waits for the next regular request from the requestor and piggybacks the identifier of the created request template in the corresponding response message. The requestor may indicate to the service layer that it is capable and willing to use request templates. This indication may be provided to the service layer during registration or the indication may be included in other request messages to indicate to the service layer that the requestor is willing to use a message template for future similar requests if assigned by the service layer.

Figure 11:
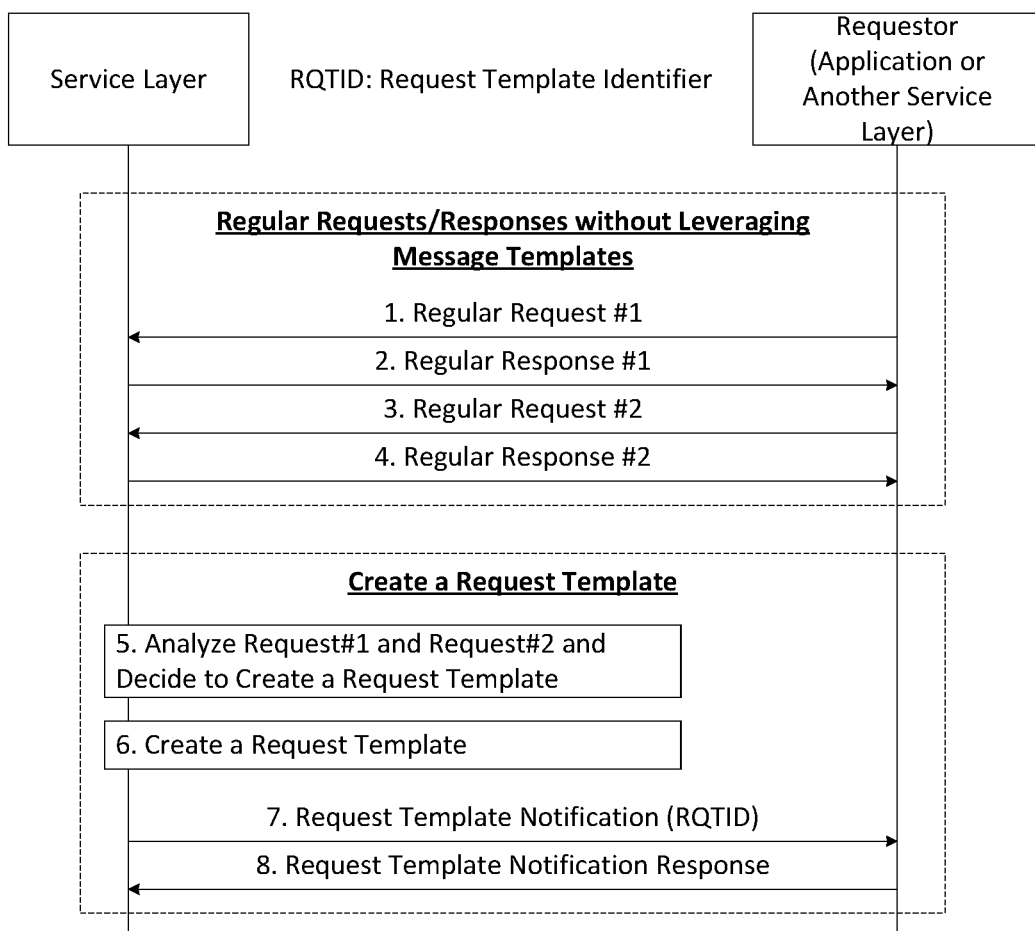
FIG. 11 illustrates a method for creating request templates initiated by the service layer and the identifiers of created request templates are sent back to the requestor using a separate notification message.

FIG. 11 illustrates a method for creating request templates initiated by the service layer and the identifiers of created request templates are sent back to the requestor using a separate notification message.

In steps 1 to 4, the requestor sends two consecutive regular requests to the service layer and the service layer responds with two consecutive responses. There can be more than two regular requests from the requestor to the service layer although the figure does not explicitly show it. The requests may include an indication that the requestor is willing and/or able to use a message template for future requests and/or responses that may be similar.

In step 5, The service layer analyzes these regular requests and intelligently figures out that the requestor uses similar or the same request parameters in each regular request. Then, it decides to create a request template (or multiple request templates). The service layer may also associate the created request template with one or more existing message template policies. For example, when the number of received consecutive requests (or non-consecutive requests) which use similar request parameters is equal to or more than a threshold integer, the service layer decides to create request templates. Then, if request parameters used in all these requests are the same, the service layer can simply create one request template to contain all these parameters. If these requests use similar request parameters but not exactly the same ones, the service layer could create multiple request templates. For example, each set of commonly used request parameters in these requests can be used to create a request template (not commonly used request parameters in each request can be also used to create a request template).

Figure 12:
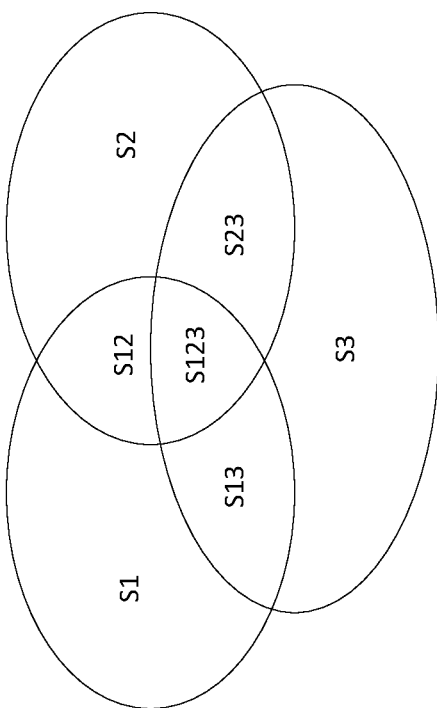
FIG. 12 shows an example where the service layer receives three consecutive regular requests, which use some similar request parameters.

FIG. 12 shows an example where the service layer receives three consecutive regular requests, which use some similar request parameters as the figure shows. For this particular scenario, the service layer may create the following request templates, although additional templates may also be possible.

Create a request template for request parameters contained in the set S123.
Create a request template for request parameters contained in the set S12.
Create a request template for request parameters contained in the set S13.
Create a request template for request parameters contained in the set S23.
Create a request template for request parameters contained in the set S12-S123.
Create a request template for request parameters contained in the set S13-S123.
Create a request template for request parameters contained in the set S23-S123.
Create a request template for request parameters contained in the set S1. This is useful if request #1 will be repeated.
Create a request template for request parameters contained in the set S2. This is useful if request #2 will be repeated.
Create a request template for request parameters contained in the set S3. This is useful if request #3 will be repeated.

In step 6, the service layer accordingly creates the request templates as decided in step 5.

In step 7, the service layer sends a Request Template Notification to the requestor to inform it of the identifiers of the created request templates (i.e. RQTID) in step 6. Alternatively, the service layer can include the representation of each created request template in this step so that the requestor does not need to take a separate step to retrieve a created request template based on RQTID.

In step 8, the requestor sends a Request Template Notification Response back to the service layer to indicate if it has successfully received RQTID from step 7.

Note that in FIG. 11, alternatively, step 5 and step 6 can occur between step 3 and step 4. Then, the service layer can piggyback RQTID in step 4; thus, step 7 and step 8 are not needed.

Figure 13:
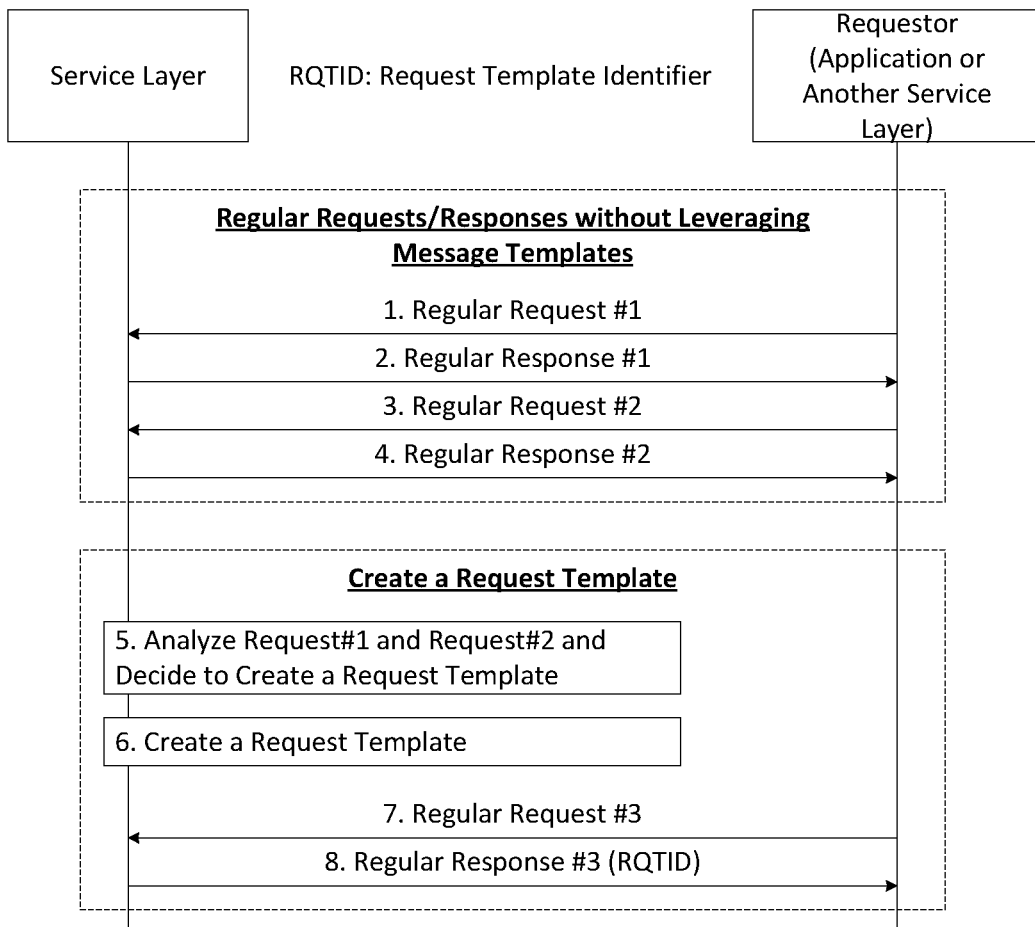
FIG. 13 illustrates a method for creating request templates initiated by the service layer and the identifiers of created request templates are piggybacked in a regular response back to the requestor.

FIG. 13 illustrates a method for creating request templates initiated by the service layer and the identifiers of created request templates are piggybacked in a regular response back to the requestor. Steps 1 to 6 are the same as steps 1 to 6 of FIG. 11.

In step 7, the requestor sends a new regular request to the service layer.

In step 8, the service layer receives the new regular request. It processes it and generates a regular response. The service layer piggybacks the identifiers of created request templates in step 6 (i.e. RQTID) in this regular response message.

In another aspect, the service layer itself (or an administration application) may proactively create request templates. Then, a requestor can discover any appropriate request template from the service layer and leverage the template to generate optimized requests and shorten the size of regular requests.

Figure 14:
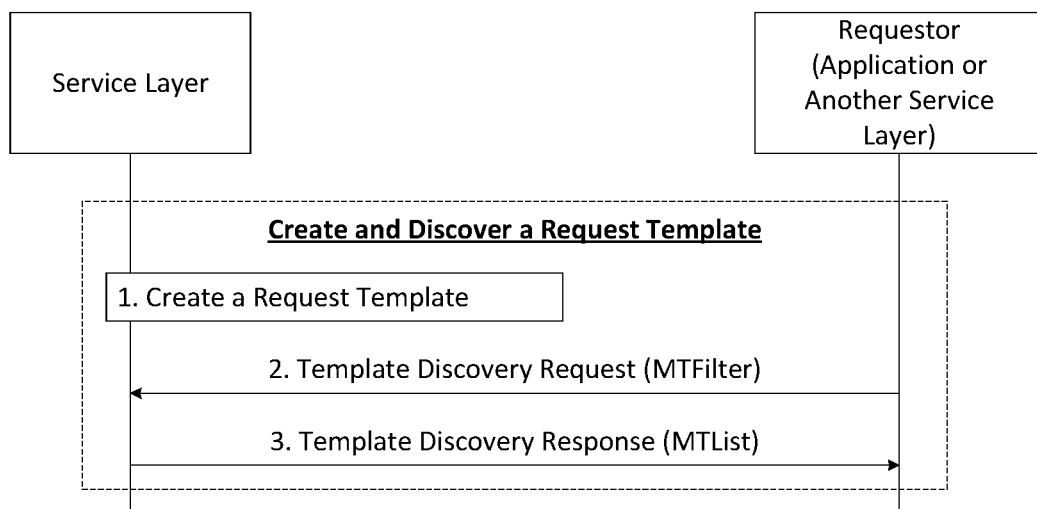
FIG. 14 illustrates a method for proactive request template creation initiated by the service layer.
Figure 15:
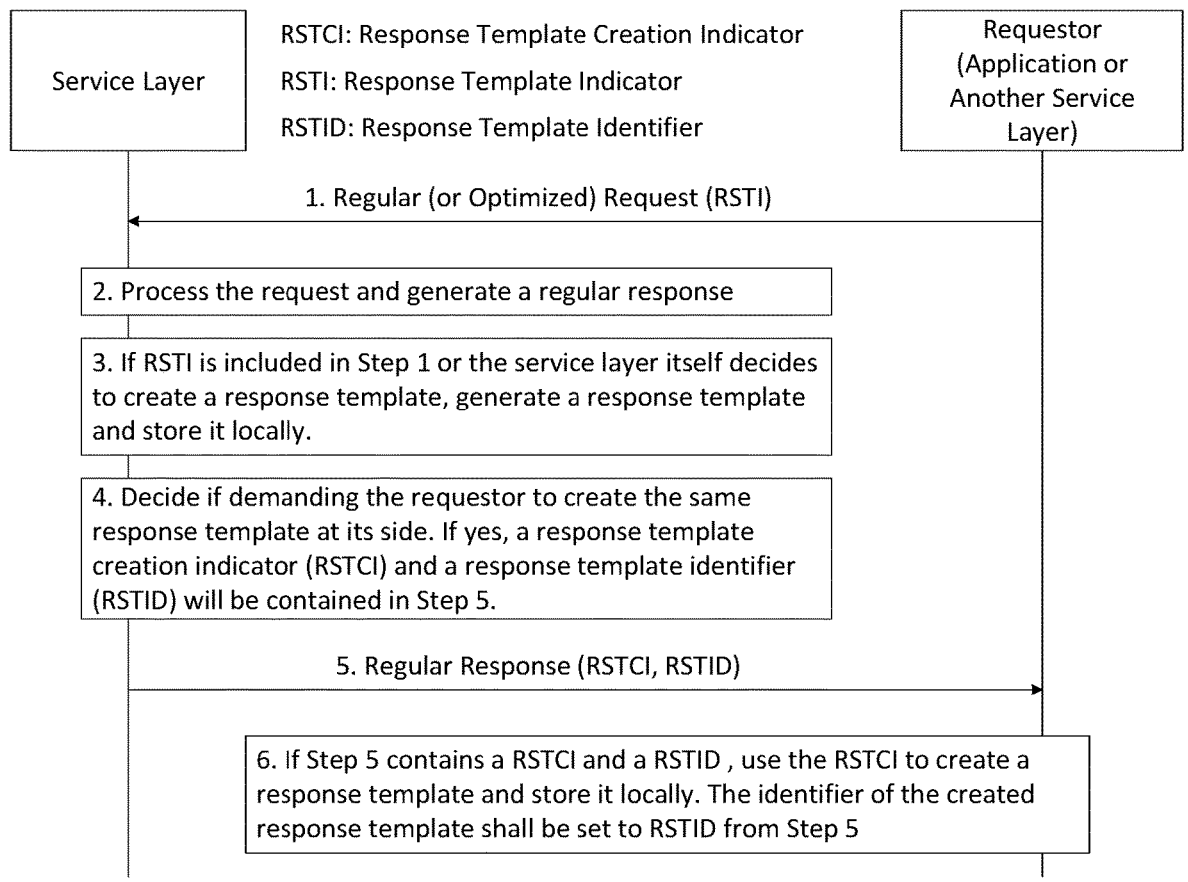
FIG. 15 illustrates a procedure for response template creation.

FIG. 14 illustrates a method for proactive request template creation initiated by the service layer.

In step 1, the service layer (or its administration application) can proactively create some request templates without considering any regular request messages from the requestor, but only based on its capability and services which can be provided to the requestor. In this way, the requestor needs to discover (or be assigned with) these request templates and use them to interact with the service layer. In other words, by creating these request templates, the service layer can specify that it only accepts request messages which use the request parameters as described in these request templates; the service layer may lose the constraints on the request template to allow a requestor to overwrite the value of some request parameters by indicating new values in its request message to the service layer. Note that the service layer can assign these created request templates to the requestor, which will be described below. The service layer may also associate the created request template with one or more existing message template policies.

In step 2, the requestor sends a Template Discovery Request to the service layer to discover request templates based on a message template filter (MTFilter). MTFilter can indicate various search criteria such as: request templates which the requestor is allowed to use, request templates which are applicable to certain target resources, request templates which contain certain request parameters, request templates for certain request types, other properties which a request template has, etc.

In step 3, the service layer searches request templates stored locally according to the criteria indicated by MTFilter. Then, it sends a Template Discovery Response message to the requestor by containing a list of request templates matching MTFilter (i.e. a list of message template identifiers in MTList). Although not shown in the figure, the requestor can send a follow-up request to the service layer to retrieve the contents of a discovered request template before it can use it to generate an optimized request. How to retrieve a request template is discussed hereinafter.

In still another aspect, when a requestor sends a regular request (or an optimized request) to the service layer, it piggybacks a Response Template Indicator (RSTI) to request the service layer to perform some tasks related to response templates (e.g. to create a new response template). If the RSTI does indicate to create a new response template, the service layer will generate a new response template, assign it with a Response Template Identifier (RSTID), and store it locally. Then, the service layer sends a regular response (or an optimized response) to the requestor. This response message will include a Response Template Creation Indicator (RSTCI) and the RSTID; RSTCI contains the response template which the service just created; then the requestor creates the same response template according to RSTCI, sets its identifier to RSTID, and stores it locally. The reason for the requestor to create the same response template is: the requestor needs to use the same response template to recover the original response message when it receives any future optimized response message.

FIG. 14 illustrates a procedure for response template creation. In step 1, the requestor sends a request message (either a regular request or an optimized request) to the service layer. This message may contain a new parameter Response Template Indicator (RSTI) to instruct the service layer to create a response template in step 3. As such, RSTI may also include response parameters and their values, which will be contained in the response template. This request may contain MTPList to indicate a list of existing message template policies which will apply to the response template being created.

In step 2, the service layer processes the request message and generates a regular response message.

In step 3, if RSTI is contained in step 1, the service layer creates a response template. The service layer may also associate the created response template with one or more existing message template policies no matter if the requestor indicates any policy in step 1. The response parameters to be included in the response template could be from the RSTI or decided by the service layer. Taking oneM2M service layer as an example, the service layer could decide to use the following response parameters with the same value in each future response; as such, a response template can be created to contain these parameters. oneM2M response parameters which can be contained in a response template include: Content, From, Result Expiration Timestamp, Event Category, etc.

In step 4, the service layer decides if the requestor needs to create the same response template at its side as well. If yes, a Response Template Creation Indicator (RSTCI) and a Response Template Identifier (RSTID) will be contained in step 5; if not, the requestor can discover and retrieve any response template from the service layer at a later time and step 5 will not contain any RSTCI and RSTID.

In step 5, the service layer sends the response generated at step 2 to the requestor. This message may contain the RSTCI and RSTID generated in step 4. In addition, this step can piggyback any response template generated previously and its identifier.

In step 6, the requestor processes the response received from step 5. If step 5 contains a RSTCI and a RSTID, use the RSTCI to create a response template and store it locally. The identifier of the created response template shall be set to RSTID from step 5.

In another aspect, the service layer may assign appropriate request templates to the requestor when it first registers itself to the service layer, or the service layer uses a dedicated template assignment request to do so. Alternatively, the requestor can issue a template discovery request with a message template filter (i.e. MTFilter) to the service layer and instruct it to look up any desired message template. After discovering or being assigned with a message template, the requestor can make a subscription to the message template in order to receive automatic notifications when the message template is updated or deleted in the future.

Figure 16:
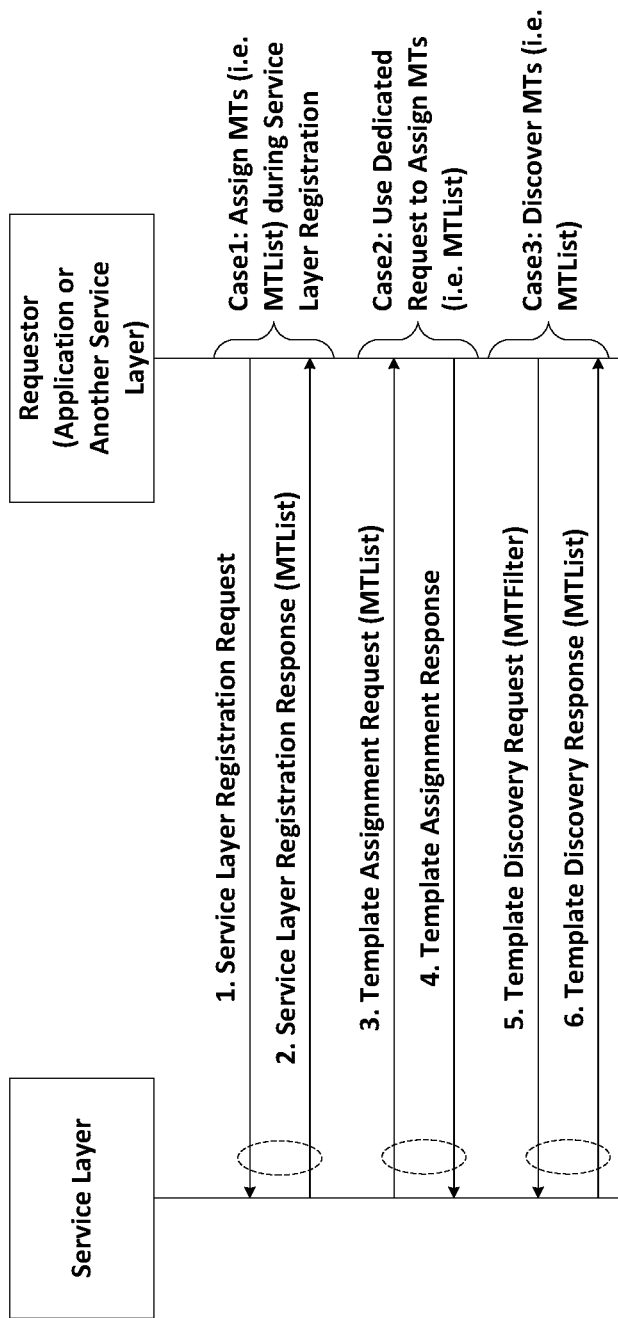
FIG. 16 illustrates a method for message template assignment and discovery, where three potential cases are shown.

FIG. 16 illustrates a method for message template assignment and discovery, where three potential cases are shown.

In Case1, the service layer assigns existing message templates to the requestor when the requestor registers itself with the service layer. In Case2, the service layer uses a separate and dedicated request message to assign existing message templates to the requestor. In Case3, the requestor discovers existing message templates from the service layer. These three cases can be executed in any order and do not need to be used together. In other words, 1) step 1 and step 2 need to be executed together for Case1, but have no dependency on other steps; 2) step 3 and step 4 need to be performed together for Case2, but have no dependency on other steps; 3) step 5 and step 6 need to take place together, but have no dependency on other steps.

In step 1, the requestor sends a Service Layer Registration Request (e.g. AE registration or CSE registration in oneM2M) to the service layer. In this registration request, the requestor may indicate the following information, based on which the service layer can select and assign more appropriate message templates for the requestor; additionally, the service layer can also leverage those information to create new message templates for the requestor:

- Whether the requestor is capable of using request templates, response templates, or both?
- Whether the requestor wants to be provisioned with some message templates?
- What types of requests (i.e. CRUD) the requestor will send frequently?
- What request and/or response parameters the requestor will use a lot?

In step 2, the service layer processes the request from step 1 and sends a Service Layer Registration Response to the requestor. This response contains a new parameter MTList to indicate a list of message template identifiers which the service layer assigns to the requestor.

In step 3, the service layer sends a Template Assignment Request to the requestor. This request contains a new parameter MTList to indicate a list of message template identifiers which the service layer assigns to the requestor.

In step 4, the requestor sends a response to the service layer.

In step 5, same as step 2 on FIG. 14.

In step 6, same as step 3 on FIG. 14.

Figure 17:
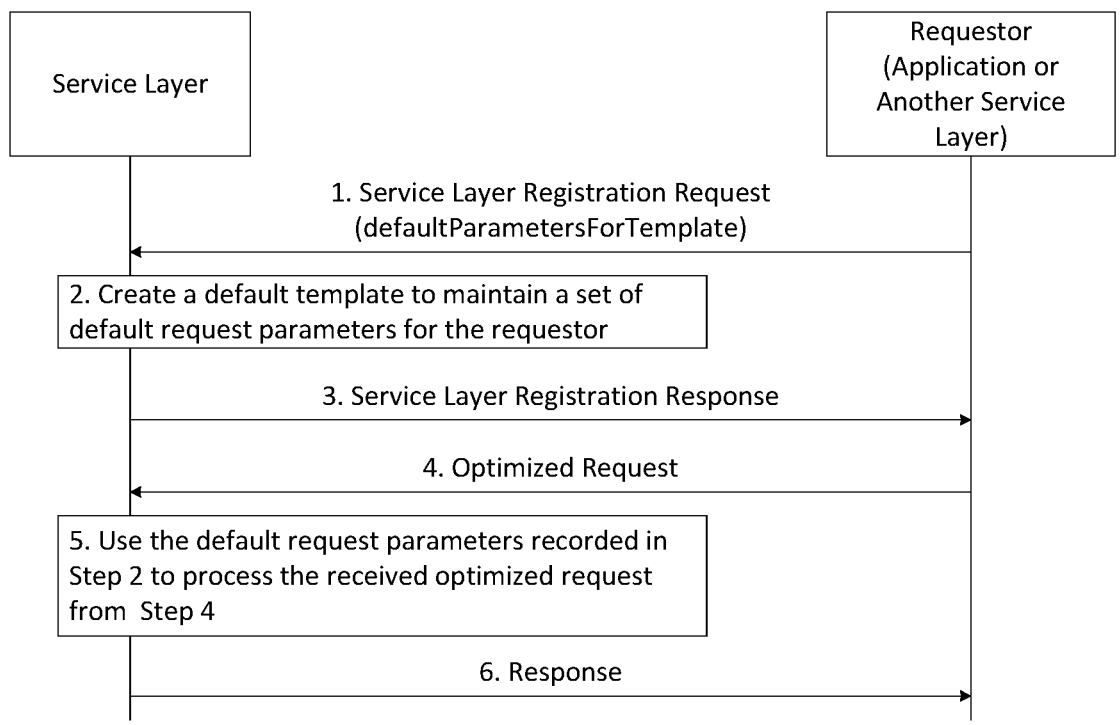
FIG. 17 illustrates a simplified and more lightweight approach for creating/assigning message template during service layer registration procedures.

FIG. 17 illustrates a simplified and more lightweight approach for creating/assigning message template during service layer registration procedures. In step 1, a requestor registers to a service layer by sending a service layer registration request. In this request, the requestor indicates or expresses some default request parameters including their values, which it will repeatedly use in subsequent requests.

In step 2, the service layer creates a default request template for the requestor to record these default parameters. The default template means any future request message from the requestor if not explicitly including a message template identifier will be processed by the service layer based on this default template. The default template will be used by the same requestor only.

In step 3, the service layer sends service layer registration response to the requestor. In addition to indicate if the service layer registration is successful or not, the service layer also indicates if the default template has been created in step 2.

In step 4, after the service layer registration is successful and the default template has been successfully created, the requestor sends an optimized request to the service layer. This optimized request no longer needs to contain a message template identifier; also, this optimized request contains no any default parameters which has been contained in step 1.

In step 5, the service layer uses the requestor's default template as created in step 2 to process the received optimized request.

In step 6, the service layer sends a message to the requestor as a response to the optimized request received from step 4.

According to yet another aspect, a requestor may use a Message Template Identifier (MTID) to retrieve a specific message template from a service layer which the message template is stored. The requestor may have obtained the MTID from one of the procedures described above.

Figure 18:
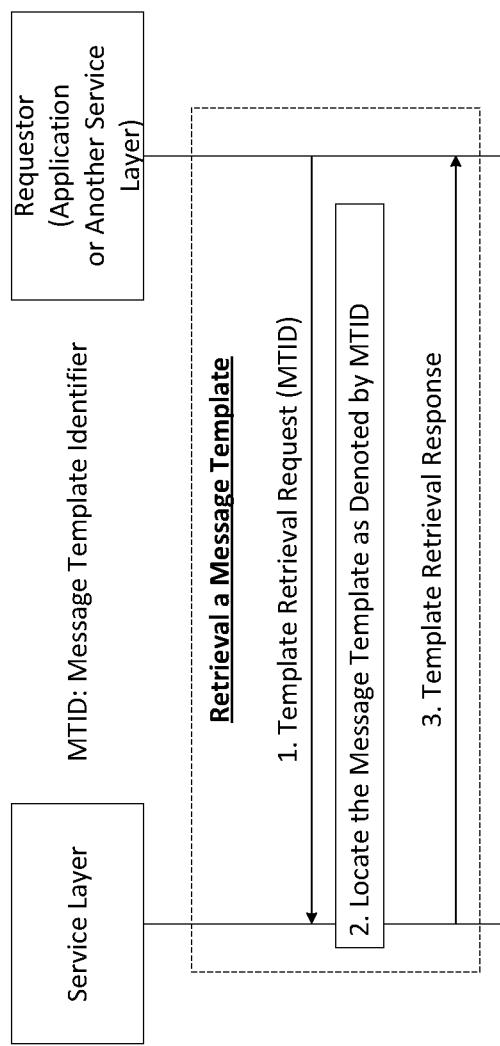
FIG. 18 illustrates a method for retrieving a message template.

FIG. 18 illustrates a method for retrieving a message template.

In step 1, the requestor sends a Template Retrieval Request to the service layer. This message contains the identifier of a message template (i.e. MTID) to be retrieved from the service layer.

In step 2, the service layer locates the message template as denoted by MTID in step 1 and generates a response to contain the representation of this message template.

In step 3, the service layer sends the response back to the requestor.

According to another aspect, after discovering a request template, being assigned with a request template or creating a request template by itself, a requestor can use it to generate an optimized request with a smaller message size in contrast to a regular request which contains many request parameters. When a service layer receives the optimized request, it extracts Request Template Identifier (RQTID) from the optimized request and uses the corresponding template to process the optimized request. If the request template as denoted by the RQTID is located in another network location (e.g. a database, a repository of templates, another service layer, etc.), the service layer needs to fetch the request template first from another service layer in order to properly process the optimized request.

Figure 19:
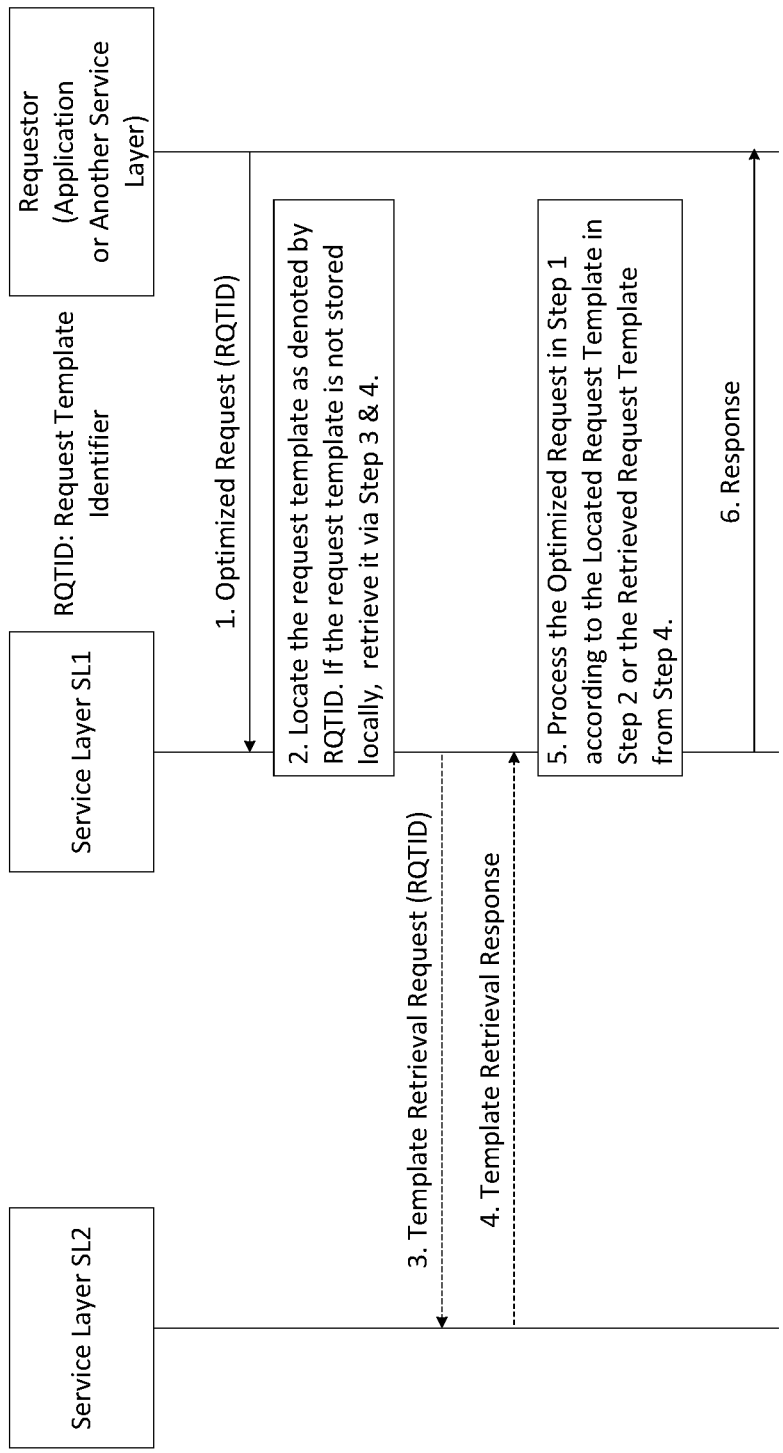
FIG. 19 illustrates a method for leveraging a request template.

FIG. 19 illustrates a method for leveraging a request template. In step 1, the requestor sends an optimized request to service layer SL1. This message contains a RQTID to indicate the identifier of the request template which the requestor has used to generate the optimized request. For generating the optimized request from a regular request, the requestor basically removes request parameters which are contained in the request template from the regular request and inserts the RQTID to the regular request.

For example, continuing the smart meter example discussed above, an optimized request message from a smart meter to the server in FIG. 2 may take the following form assuming oneM2M is used as a service layer, where rqtid123 stands for the example smart meter request template described above and stored at the server:

```
<?xml version="1.0" encoding="UTF-8"?>
<m2m:optimizedRequest xmlns:m2m="http://www.onem2m.org/xml/protocols">
    <rqi>0002bf63</rqi>
    <rqtid>rqtid123</rqtid>
```

```xml
<pc>
  <m2m:cin>
    <cnf>application/xml:1</cnf>
    <con>PHRpbWU+MTc4ODkzMDk8L3RpbWU+PHRlbXA+MjA8L3RlbXA+DQo=</con>
  </m2m:cin>
</pc>
</m2m:optimizedRequest>
```

In this example, pc is the Content parameter of datatype m2m:primitiveContent: the attributes of the resource to be provided by the Originator. cin is the Root element of the <contentInstance> resource of datatype m2m:contentInstance. This includes the mandatory attributes (and optional attributes not shown in this example) supplied by the request Originator. In this example, the Content parameter includes an instance of a <contentInstance> resource which consists of two attributes: contentInfo (cnf)—which specifies base64 encoding—and the content (con) itself.

If the request template were not available or not employed, the smart meter would need to send the following regular request message to the server. In contrast, the optimized request reduces the message size by removing nine request parameters, although it needs to contain the RQTID.

```xml
<?xml version="1.0" encoding="UTF-8"?>
<m2m:regularRequest xmlns:m2m="http://www.onem2m.org/xml/protocols">
  <rqi>0002bf63</rqi>
  <op>1</op>
  <to>//example.net/serverCSE/meterAE123/meterContainer234</to>
  <fr>meterAE123</fr>
  <ty>4</ty>
  <rqet>3600</rqet>
  <oet>600</oet>
  <rt>1</rt>
  <ec>3</ec>
  <tqi>1</tqi>
  <pc>
    <m2m:cin>
      <cnf>application/xml:1</cnf>
      <con>PHRpbWU+MTc4ODkzMDk8L3RpbWU+PHRlbXA+MjA8L3RlbXA+DQo=</con>
    </m2m:cin>
  </pc>
</m2m:regularRequest>.
```

Referring still to FIG. 19, in step 2, the service layer SL1 locates corresponding request template based on the RQTID. If the request template is stored at another service layer SL2, service layer SL1 uses steps 3 & 4 to retrieve the request template.

In step 3, the service layer SL1 sends a Template Retrieval Request to service layer SL2 to retrieve the request template as denoted by RQTID.

In step 4, the service layer SL2 sends a Template Retrieval Response to service layer SL1. This response contains the representation (i.e. request parameters) of the retrieved request template.

In step 5, the service layer SL1 uses the information from the retrieved request template to translate the optimized request to a regular request (i.e. copy request parameters contained in the request template to the optimized request and remove RQTID from the optimized request). Then, it processes the regular request and generates a regular response.

In step 6, the service layer SL1 sends the regular response back to the requestor.

Figure 20:
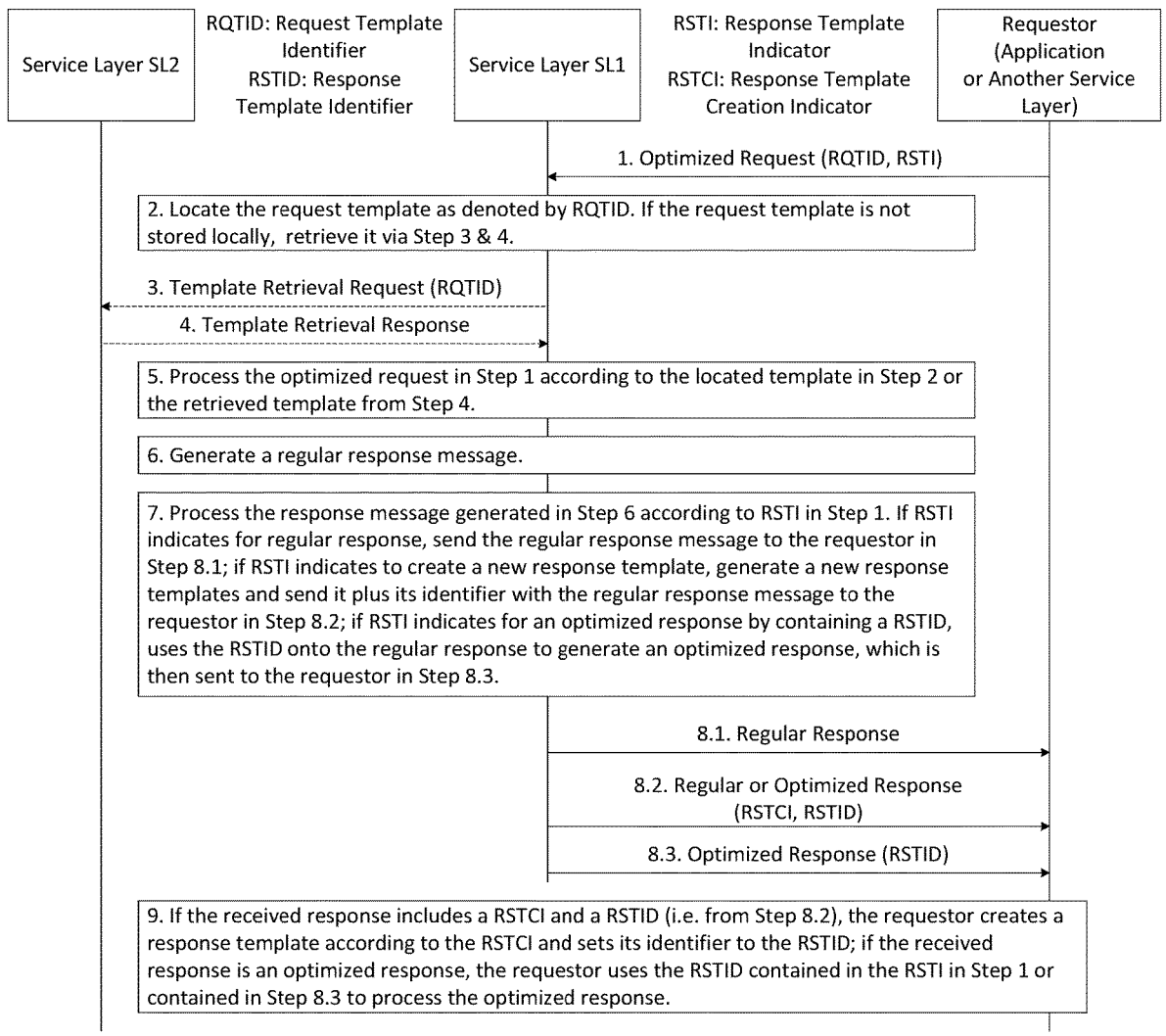
FIG. 20 illustrates a method for leveraging request and response templates.

FIG. 20 illustrates a method for leveraging request and response templates. In step 1, a requestor sends an optimized request to service layer SL1. This message contains a RQTID to indicate the identifier of the request template which the requestor has used to generate the optimized request. For generating the optimized request from a regular request, the requestor basically removes request parameters which have been contained in the request template from the regular request and inserts the RQTID to the regular request. In addition, the optimized request also contains a Response Template Indicator (RSTI). The RSTI can have the following values, based on which the service layer SL1 will decide to create and/or leverage a response template or not in step 7:

RSTI="Regular Response"—This instructs the service layer SL1 in step 7 to not create or leverage response template, but to send a regular response to the requestor.

RSTI="Create a New Response Template"—This instructs the service layer SL1 in step 7 to create a response template. In this case, RSTI also indicates which response parameters including values shall be contained in the response template.

RSTI="Use the Response Template to Generate an Optimized Response"—This instructs the service layer SL1 in step 7 to leverage a response template to generate an optimized response. In this case, RSTI also indicates the identifier of the response template (i.e. RSTID) to be used for generating the optimized response.

In step 2, the service layer SL1 locates corresponding request template based on the RQTID. If the request template is stored at another service layer SL2, the service layer SL1 uses step 3 & 4 to retrieve the request template.

In step 3, the service layer SL1 sends a Template Retrieval Request to the service layer SL2 to retrieve the request template as denoted by RQTID.

In step 4, the service layer SL2 sends a Template Retrieval Response to the service layer SL1. This response contains the representation (i.e. request parameters) of the retrieved request template.

In step 5, the service layer SL1 uses the retrieved request template to translate the optimized request to a regular request (i.e. copy request parameters contained in the request template to the optimized request and remove RQTID from the optimized request).

In step 6, the service layer SL1 processes the regular request and generates a regular response.

In step 7, according to the RSTI contained in step 1, the service layer SL1 performs the following actions.
- If RSTI="Regular Response", do nothing and just send a regular response to the requestor in step 8.1.
- If RSTI="Create a New Response Template", create a response template by copying all response parameters including their values contained in the RSTI to the response template and assign an identifier for the created response template (i.e. RSTID). Then, send the generated response template via the parameter RSTCI and RSTID in step 8.2 to the requestor.
- If RSTI="Use the Response Template to Generate an Optimized Response", leverage the response template as denoted in RSTI in step 1 to generate an optimized response. Then, send the optimized response to the requestor in step 8.3.

In step 8, The service layer sends a response to the requestor by using one of the following three steps:
- step 8.1: the service layer SL1 sends a regular response to the requestor.
- step 8.2: the service layer SL2 sends a regular or an optimized response to the requestor. But the regular response contains two new parameters RSTCI and RSTID. RSTCI contains the response template created in step 7 and RSTID is its identifier. If sending the optimized response, the optimized response shall be based on the new response template created in step 7 and contained in the RSTCI.
- step 8.3: the service layer SL1 sends an optimized response to the requestor, which was generated in step 7. This message contains the identifier of the response template used in step 7 to generate the optimized response.

In step 9, the requestor processes the response message received from step 8.1, step 8.2, or step 8.3.

If the response is from step 8.1 (i.e. a regular response without any new parameter), the requestor simply processes it as a regular response.

If the response is from step 8.2 (i.e. a regular response with RSTCI and RSTID included), the requestor creates/stores the same response template locally according to the RSTCI and sets its identifier to RSTID so that the same response template stored at the service layer SL1 and the requestor has the same identifier.

If the response is from step 8.3 (i.e. an optimized response), the requestor locates the corresponding response template according to RSTID. Then it uses the response template to translate the optimized response to a regular response (i.e. copy all response parameters and their values from the response template to the optimized response).

In yet another aspect, a requestor may use Message Template Identifier (MTID) to update a specific message template stored at a service layer. There may be two scenarios. In Case1, the requestor sends a dedicated template update request to the service layer; in Case2, when the requestor performs any kind of normal requests with the service layer, it sends a MTID plus Message Template Update Indicator (MTUI) to the service layer simultaneously; as a result, the service layer will first process the normal request from the requestor and then update the corresponding message template according to what the MTID and the MTUI specify. If the updated message template has been used and/or subscribed by other requestors, the service layer needs to send a notification to those requestors and inform them of the update. In addition, the service layer could monitor incoming requests from a requestor which references an existing template. Based on this monitoring, the SL can detect cases where existing template parameter values require updating (e.g. the requestor keeps overwriting a request parameter in the existing template) and/or cases where new common parameters can be added to the template (e.g. the requestor keeps using new parameters not included in the existing template); the service layer can automatically update the existing template by updating its existing parameter values and/or adding new parameters to the template.

Figure 21:
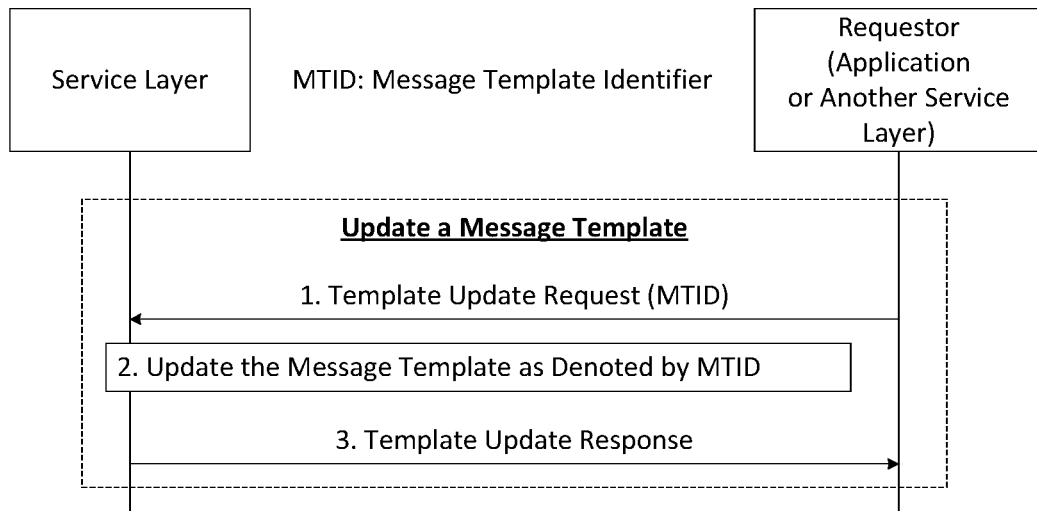
FIG. 21 illustrates a method for updating a message template using dedicated messages.

FIG. 21 illustrates a method for updating a message template using dedicated messages. In step 1, the requestor sends a Template Update Request to the service layer. This message contains the identifier of a message template (i.e. MTID) and its parameters/properties to be updated (e.g. its allowed requestors, its target resources, its child request template, etc.).

In step 2, the service layer accordingly makes an update to the message template as denoted by the MTID according to other information contained in step 1. If the updated message template has been used and/or subscribed by other requestors, the service layer needs to send a notification to those requestors and inform them of the update.

In step 3, the service layer sends a Template Update Response to the requestor to indicate if step 1 has been successfully processed.

Figure 22:
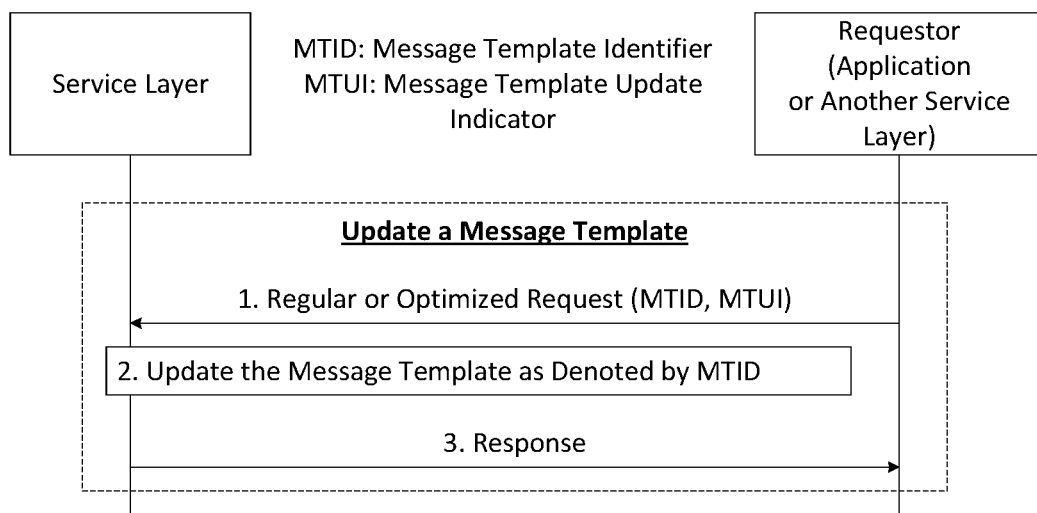
FIG. 22 illustrates a method for updating a message template concurrently when the requestor sends a request message to the service layer.

FIG. 22 illustrates a method for updating a message template concurrently when the requestor sends a request message to the service layer. In step 1, the requestor sends a request message (either a regular one or an optimized one) to the service layer. This message contains the following information:
- MTID: the identifier of an existing message template to be updated.
- MTUI: message template update indicator. This parameter tells the service layer: 1) the message identifier as denoted by the MTID needs to be updated; 2) the parameters and/or properties of the message template to be updated. Alternatively, this parameter can indicate some request parameters which are included in this request message and the service layer shall use them to update the message template denoted by the MTID.

In step 2, the service layer processes the request message and generates a regular response (or an optimized response). Then, it updates the message template as denoted by the MTID according to the MTUI in step 1. If the updated message template has been used and/or subscribed by other requestors, the service layer needs to send a notification to those requestors and inform them of the update.

In step 3, the service layer sends the response to the requestor to indicate if step 1 has been successfully processed.

In another aspect, a requestor may use Message Template Identifier (MTID) to delete a specific message template stored at a service layer. There are two scenarios. In Case1, the requestor sends a dedicated template deletion request to the service layer; in Case2, when the requestor performs any kind of normal requests with the service layer, it sends a MTID plus a Message Template Deletion Indicator (MTDI) to the service layer simultaneously; as a result, the service layer will first process the normal request from the requestor and then delete the corresponding message template according to what the MTID and the MTDI specify. If the deleted message template has been used or subscribed by other requestors, the service layer will send a notification to those requestors and inform them of the removal of the message template. The deletion operation here could mean that the requestor no longer wants to use the message template deleted. In addition, the service layer can monitor how existing templates have been used; if a template has not been used by any requestor for some time or is no longer relevant, the service layer can automatically delete this template.

Figure 23:
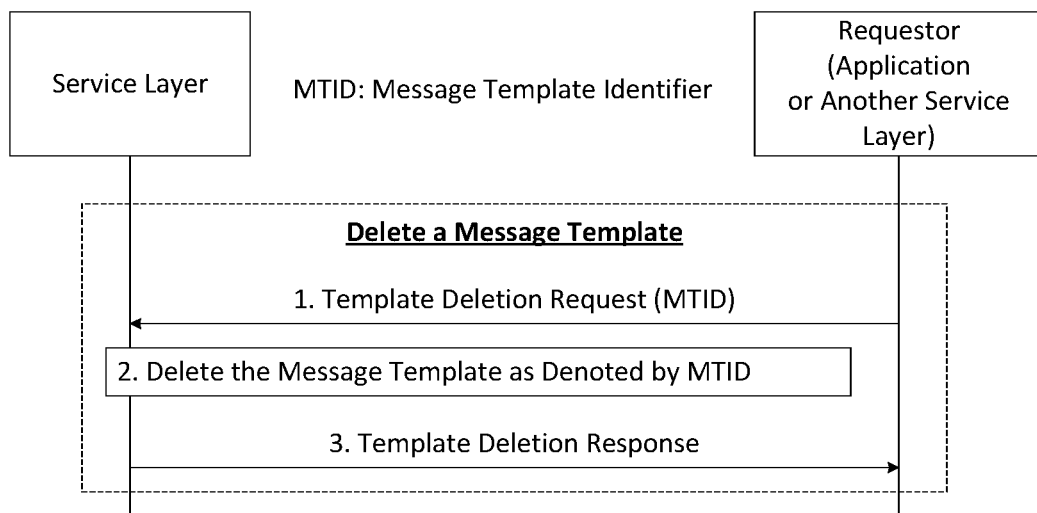
FIG. 23 illustrates a method for deleting a message template using dedicated messages.

FIG. 23 illustrates a method for deleting a message template using dedicated messages. In step 1, the requestor sends a Template Deletion Request to the service layer. This message contains the identifier of a message template (i.e. MTID) to be deleted.

In step 2, the service layer accordingly removes the message template as denoted by the MTID. If the deleted message template has been used or subscribed by other requestors, the service layer will send a notification to those requestors and inform them of the removal of the message template.

In step 3, the service layer sends a Template Deletion Response to the requestor to indicate if step 1 has been successfully processed.

Figure 24:
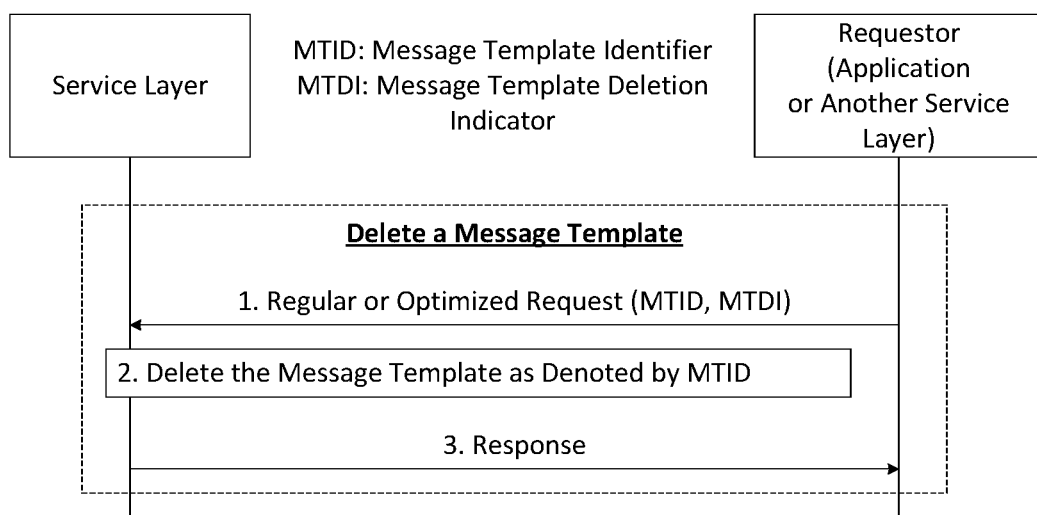
FIG. 24 illustrates a method for deleting a message template concurrently when the requestor sends a request message to the service layer.

FIG. 24 illustrates a method for deleting a message template concurrently when the requestor sends a request message to the service layer. In step 1, the requestor sends a request message (either a regular one or an optimized one) to the service layer. This message contains the following information:

MTID: the identifier of an existing message template to be deleted.

MTDI: message template deletion indicator. This parameter tells the service layer to delete the message template as denoted by the MTID In step 2, the service layer processes the request message and generates a regular response (or an optimized response). Then, it deletes the message template as denoted by the MTID. If the deleted message template has been used or subscribed by other requestors, the service layer will send a notification to those requestors and inform them of the removal of the message template.

In step 3, the service layer sends the response to the requestor to indicate if step 1 has been successfully processed.

In another aspect, given the fact that RQTID is generally much shorter than the total size of request parameters, a requestor can contain multiple RQTIDs in one optimized request. Then, the service layer will use the union of these multiple RQTIDs (i.e. the combination of all request parameters included in these RQTIDs) to process the optimized request and accordingly generate one response message to the requestor. This feature allows multiple request templates to be used together as a joint template and give more granularity and flexibility in managing and reusing request templates.

Figure 25:
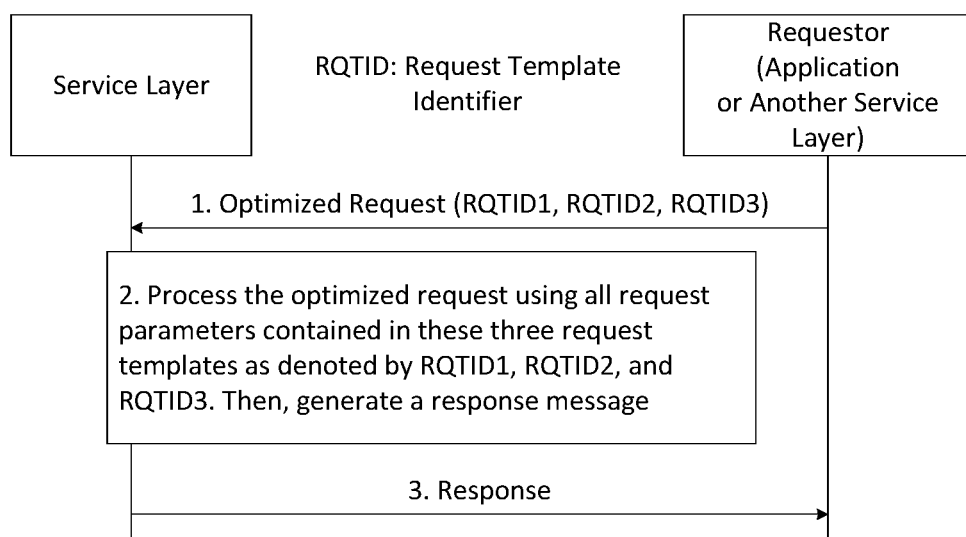
FIG. 25 illustrates a method for leveraging multiple request templates in one request message.

FIG. 25 illustrates a method for leveraging multiple request templates in one request message. It's assumed: 1) the requestor has discovered two or more (the figure showed 3 discovered templates) request templates; 2) each of these templates do not contain any identical parameter, but a subset of request parameters which the requestor will use; 3) the templates together contain all request parameters which the requestor needs to use.

In step 1, the requestor uses these three request templates to generate an optimized request, which does not contain any request parameter in these templates, but only includes the identifiers of these three templates (i.e. RQTID1, RQTID2, and RQTID3).

In step 2, the service layer processes the optimized request using all request parameters contained in these three request templates as denoted by RQTID1, RQTID2, and RQTID3. Then, it generates a response message. Note that request parameters contained in a request template does not have to be in order.

In step 3, the service layer sends a response message to the requestor to indicate if the optimized request in step 1 has been successfully processed.

In accordance with yet another aspect, message templates can be used under multi-hop service layer communications. Assume the requestor sends request messages to a destination service layer via a transit service layer in the middle. There are two service layer hops (i.e. the first hop between the requestor and the transit service layer and the second hop between the transit service layer and the destination service layer). For example, the requestor sends a service layer group operation to the transit service layer, which then fanouts the operation to one or multiple destination service layers (i.e. group members). Accordingly, request templates can be leveraged in the following four cases.

In Case1, the requestor uses a request template to generate optimized requests and sends them to the transit service layer, and the transit service layer simply forwards any optimized request to the destination service layer, where the optimized request will be processed based on corresponding request template; in this case, the transit service layer has no template-related functionality.

In Case2, the requestor still uses a request template to generate optimized requests and sends them to the transit service layer, but the transit service layer leverages its request template to process the received optimized request from the requestor and forwards a regular request to the destination service layer; in this case, the destination service layer does not have any template-related functionality.

In Case3, the requestor still uses a request template to generate optimized requests and sends them to the transit service layer, and the transit service layer processes the optimized request using its request template; furthermore, the transit service layer generates a new optimized request using another request template and forwards the new optimized request to the destination service layer, where the new optimized request will be processed using corresponding request template; in this case, both the transit service layer and the destination service layer have template-related functionality, but two service layer hops use different request template.

In Case4, the requestor sends regular requests to the transit service layer, which uses a request template to generate optimized request and sends it to the destination service layer; in this case, the requestor does not support template-related functionality.

Note that in order to enable the above multi-hop scenarios more efficiently, RQTID can be in the format of a resolvable network address or identifier (e.g. a URI). RQTID in this format will enable intermediate or transit service layers as well as destination service layers to fetch the request template from another network location and store it locally, and in turn to be able to process optimized requests even if they originally do not have a local copy of the request template.

Figure 26:
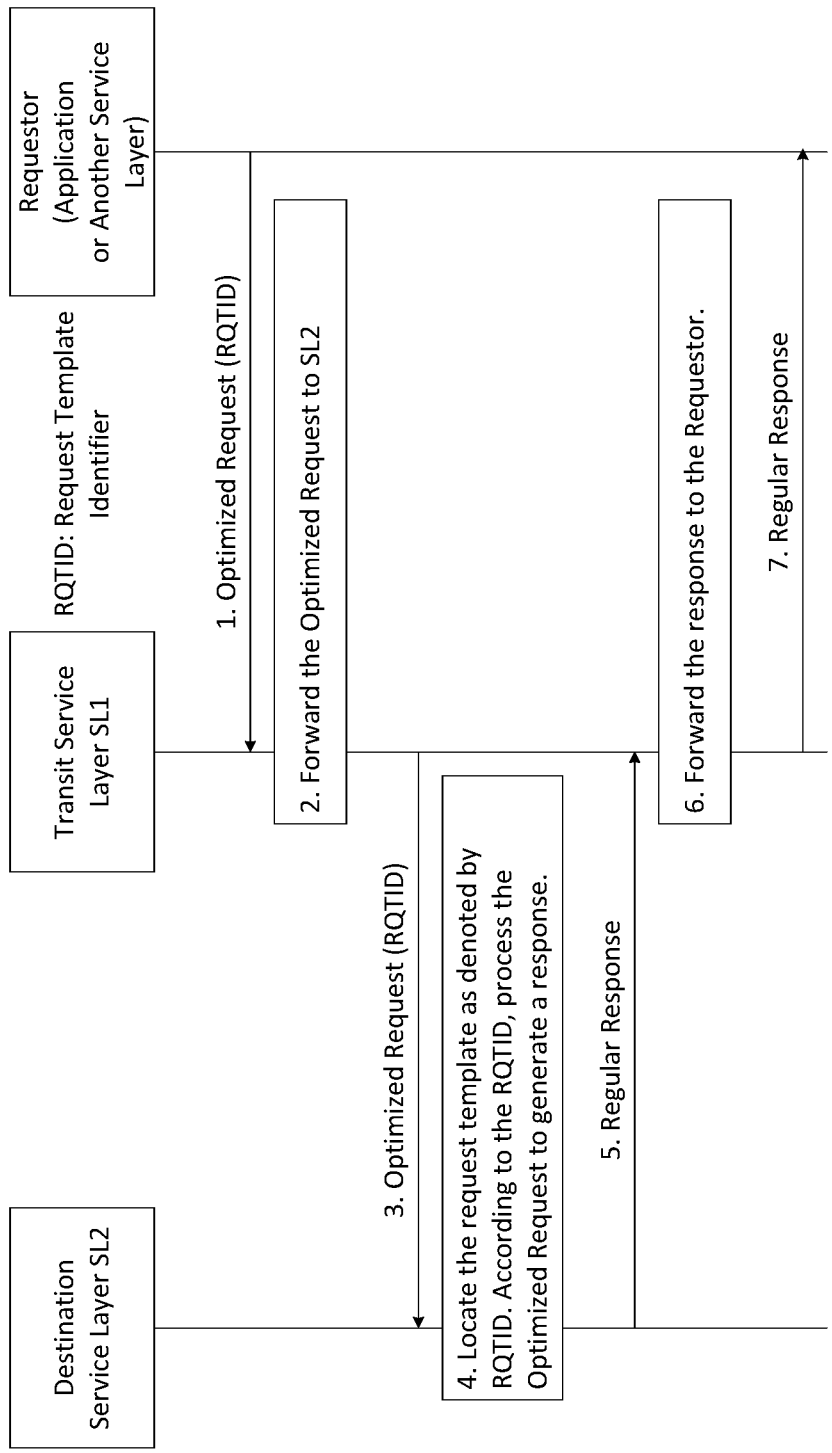
FIG. 26 illustrates a method for using request templates for multi-hop service layer communications when the transit service layer does not support template-related functionality.

FIG. 26 illustrates a method for using request templates for multi-hop service layer communications when the transit service layer does not support template-related functionality. In step 1, the requestor sends an optimized request to the transit service layer. This message contains a RQTID to indicate the identifier of the request template which the requestor has used to generate the optimized request. The requestor may also contain a new indicator in this message to instruct the service layer in step 2 to automatically forward the request to another service layer.

In step 2, the transit service layer simply forwards the optimized request to the destination service layer.

In step 3, the transit service layer sends the optimized request to the destination service layer.

In step 4, the destination service layer receives the optimized request and uses the RQTID to locate the corresponding request template. Then, it processes the optimized request based on the request template and generate a regular response.

In step 5, the destination service layer sends a regular response back to the transmit service layer.

In step 6, the transit service layer receives the regular response, and in step 7, the transit service layer forwards the regular response to the requestor.

Figure 27:
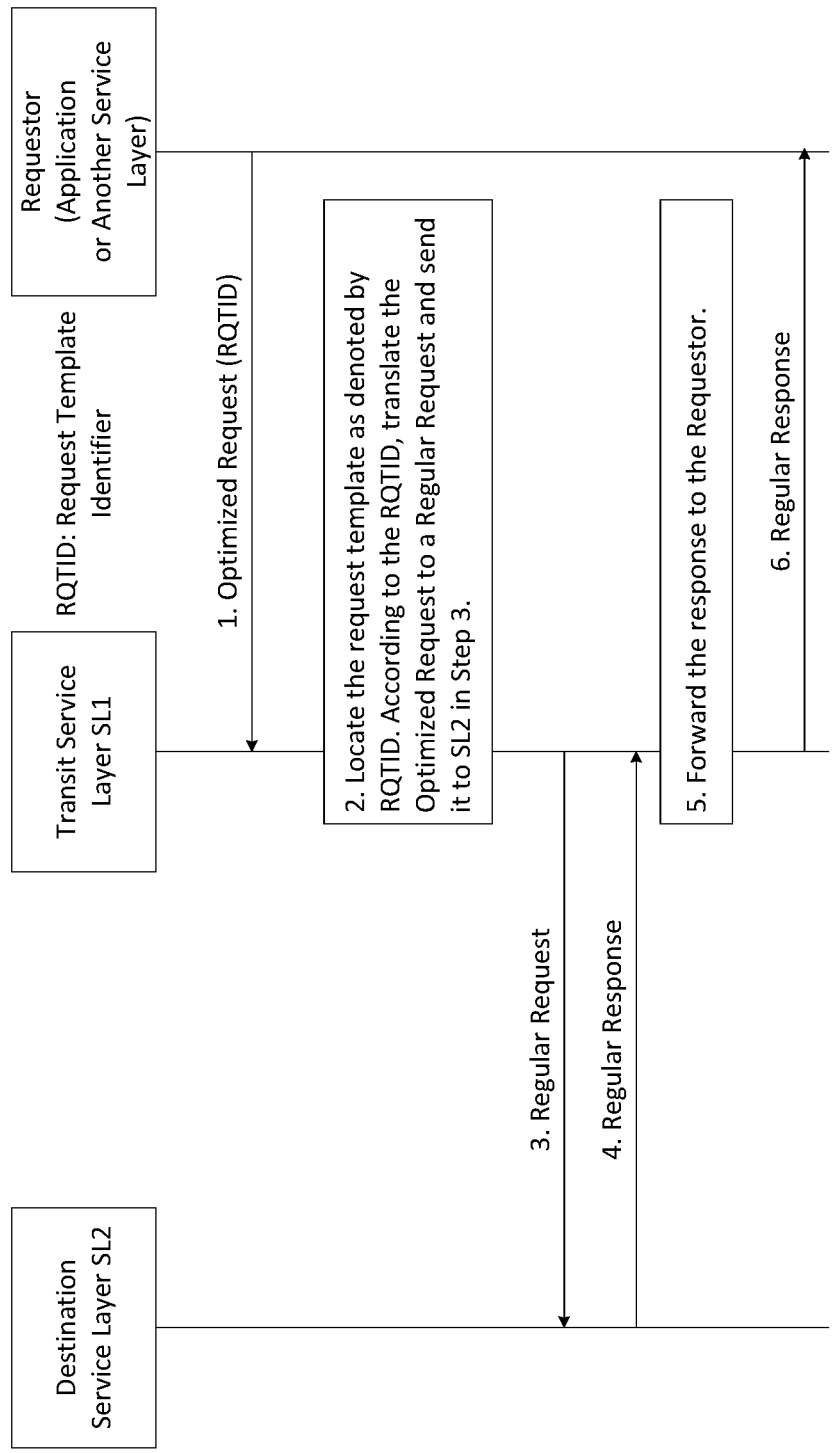
FIG. 27 illustrates a method for using request templates in multi-hop service layer communications when the destination service layer does not support template-related functionality.

FIG. 27 illustrates a method for using request templates in multi-hop service layer communications when the destination service layer does not support template-related functionality. In step 1, the requestor sends an optimized request to the transit service layer. This message contains a RQTID to indicate the identifier of the request template which the requestor has used to generate the optimized request. The requestor may also contain a new indicator in this message to instruct the service layer in step 2 to process this optimized request before it forwards it to another service layer.

In step 2, the transit service layer locates corresponding request template based on the RQTID. Then it uses the request template to translate the optimized request to a regular request (i.e. copy request parameters contained in the request template to the optimized request and remove RQTID from the optimized request).

In step 3, the transit service layer sends the regular request to the destination service layer.

In step 4, the destination service layer processes the regular request and sends a regular response back to the transit service layer.

In step 5, the transit service layer receives the regular response, and in step 6, the transit service layer forwards the regular response to the requestor.

Figure 28:
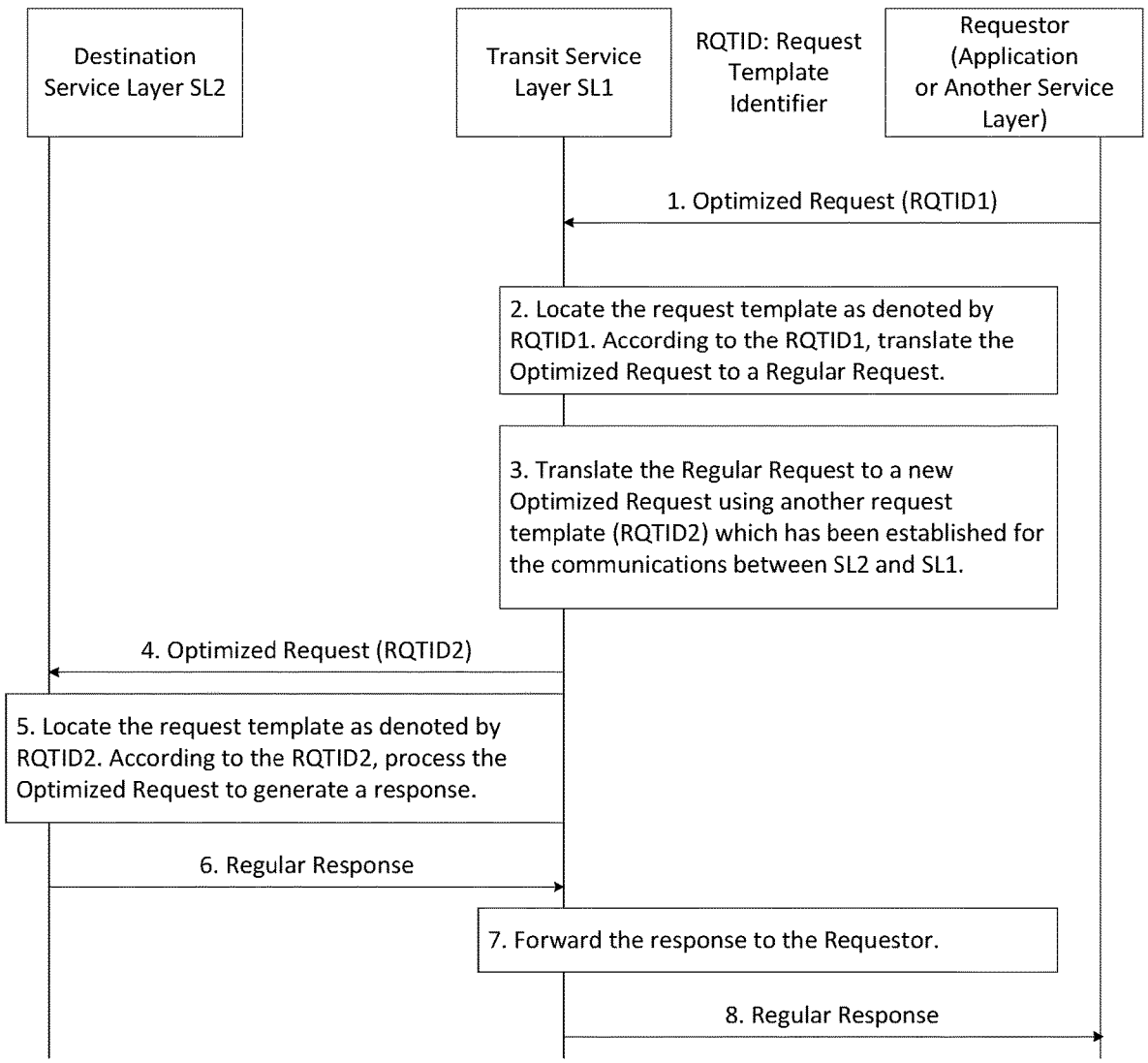
FIG. 28 illustrates a method for using request templates in multi-hop service layer communications when both the transit service layer and the destination service layer support template-related functionality.

FIG. 28 illustrates a method for using request templates in multi-hop service layer communications when both the transit service layer and the destination service layer support template-related functionality. In step 1, the requestor sends an optimized request to the transit service layer. This message contains a RQTID1 to indicate the identifier of the request template which the requestor has used to generate the optimized request. The requestor may also contain a new indicator in this message to instruct the service layer in step 2 to process this optimized request before it forwards it to another service layer.

In step 2, the transit service layer locates corresponding request template based on the RQTID1. Then it uses the request template to translate the optimized request to a regular request (i.e. copy request parameters contained in the request template to the optimized request and remove RQTID1 from the optimized request).

In step 3, the transit service layer uses another request template as denoted by RQTID2 to translate the regular request in step 2 to an optimized request (i.e. remove request parameters contained in the request template as denoted by RQTID2 from the regular request and insert RQTID2 to the regular request).

In step 4, the transit service layer sends the optimized request to the destination service layer.

In step 5, the destination service layer receives the optimized request and uses the RQTID2 to locate the corresponding request template. Then, it processes the optimized request based on the request template and generate a regular response.

In step 6, the destination service layer sends the regular response to the transit service layer.

In step 7, the transit service layer receives the regular response, and in step 8, the transit service layer forwards the regular response to the requestor.

Figure 29:
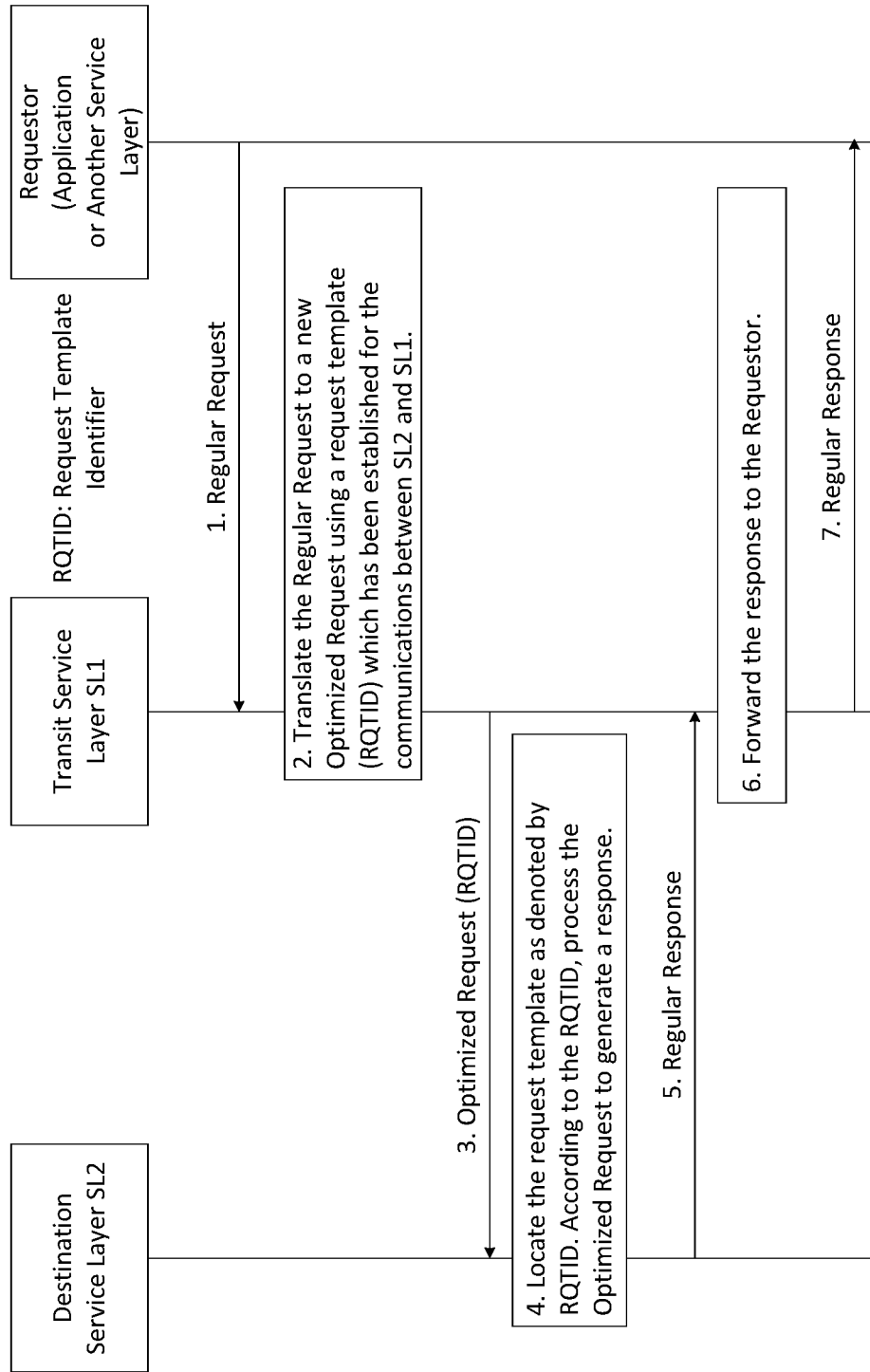
FIG. 29 illustrates a method for using request templates in multi-hop service layer communications when the requestor does not support template-related functionality.

FIG. 29 illustrates a method for using request templates in multi-hop service layer communications when the requestor does not support template-related functionality. In step 1, the requestor sends a regular request to the transit service layer. The requestor may also contain a new indicator in this message to instruct the service layer in step 2 to process this optimized request before it forwards it to another service layer.

In step 2, the transit service layer uses a request template as denoted by RQTID to translate the regular request to an optimized request (i.e. remove request parameters contained in the request template as denoted by RQTID from the regular request and insert RQTID to the regular request).

In step 3, the transit service layer sends the optimized request to the destination service layer.

In step 4, the destination service layer receives the optimized request and uses the RQTID to locate the corresponding request template. Then, it processes the optimized request based on the request template and generate a regular response.

In step 5, the destination service layer sends the regular response to the transit service layer.

In step 6, the transit service layer receives the regular response, and in step 7, the transit service layer forwards the regular response to the requestor.

In another aspect, a requestor or a service layer may specify certain applicability policies for one or more message template (referred to as message template policies). A message template policy can be applied to multiple templates; also, the applicability of a template could be constrained or defined by multiple message template policies. The service layer can use message template policies to determine whether/when to apply a template for which requestor. The message template policies could be defined as a part of a template or as a separate information object or resource outside of the template; for the latter case, the association between the template and corresponding message template policies will be established by the service layer or the requestor. As such, the requestor could generate optimized requests without explicitly indicating the template identifier, because the service layer can automatically locate or identify the appropriate template according to the message template policies set up for the requestor. For example, a requester can specify a message template policy to the service layer that instructs the service layer to apply a specified template to all its requests.

Figure 30:
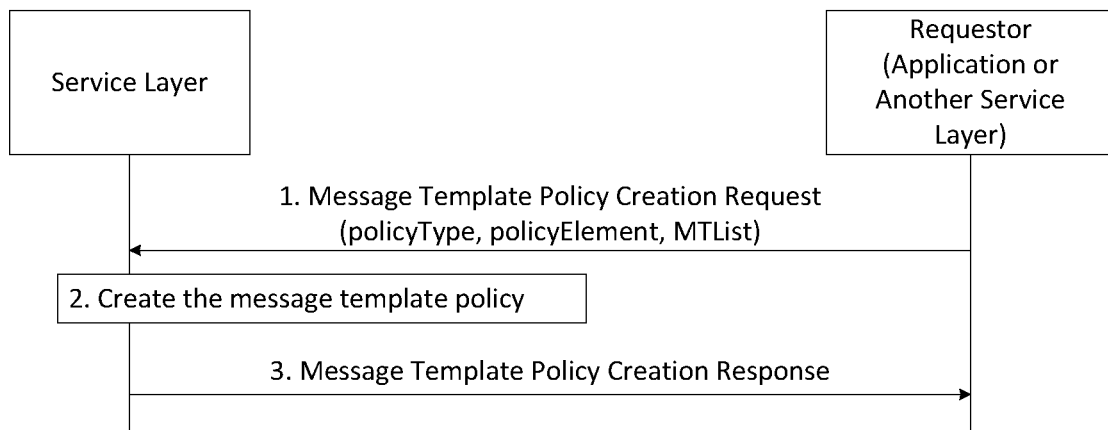
FIG. 30 illustrates a method for creating a message template policy.

FIG. 30 illustrates a method for creating a message template policy. In step 1, a requestor sends a Message Template Policy Creation Request to a service that instructs the service layer to create a message template policy. The message may contain the following information:

(a) policyType: indicates this policy to be created is for message template.
(b) policyElement: it describes what the polices defines, allows, limits, etc. A policy could consist of multiple policyElements, which together in a union and/or intersection operation define the whole policy. A policyElement could be based on or describe the following conditions:
  Requests targeting resources locally hosted by a service layer can use message template
  Requests targeting resources hosted on remote service layer can use message template
  Requests targeting resources of a specific type can use message template
  Requests from requesters that are registrants to a service layer can use message template
  Requests issued in a certain time window can use message template
  Requests issued from certain locations can use message template
  Requests targeting devices in certain locations can use message template
  Requests that exceed a certain size threshold can use message template
  Requests that are issued with a rate that exceed a certain threshold can use message template.
(c) MTList: this is a list of message template identifiers which the creating policies will be applied to. This parameter is optional. If this parameter is not included in step 1, the message templates which the creating policies could be applied to are pending, and the procedure in FIG. 31 can be used to associate one or more message templates with the creating policies.

In step 2, according to the information contained in step 1, the service layer creates corresponding message template policies. Alternatively, without a request from the requestor, the service layer itself could proactively create a message template policy and associate it with any existing message template. If MTList is included in step 1, the service layer needs to update those message templates as contained in the MTList, for example, by associating them with the message template policy just created.

In step 3, the service layer sends a Message Template Policy Creation Response to the requestor to indicate if the message template has been successfully created and/or if the association with the designated message template in MTList has been successful. Note that if MTList is not included in the step 1, when a requestor (or a service layer) initiates to create a message template, it can indicate an existing message template policy and associate it with the message template to be created.

Figure 31:
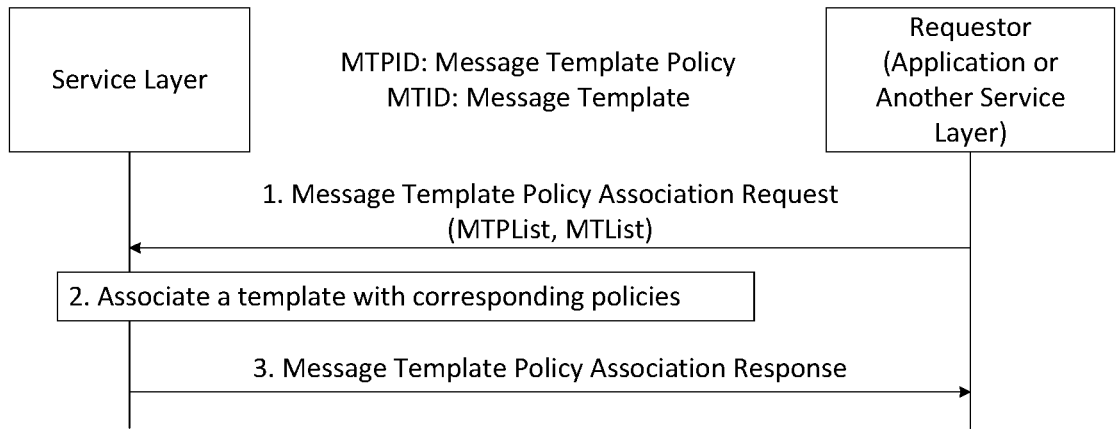
FIG. 31 illustrates a method for associating a message template with message template policies or vice versa.

FIG. 31 illustrates a method for associating a message template with message template policies or vice versa. In step 1, the requestor sends a Message Template Policy Association Request to the service layer. This message needs to contain the following two parameters:
  MTPList: A list of message template policies identifiers which together will be applied to each of the message template as contained in MTList.
  MTList: A list of message templates. The applicability of each template is described by all policies as contained in MTPList.

In step 2, the service layer associates all policies in MTPList with each template in MTList. Note that the service layer can proactively associate certain policies with an existing message template without receiving any request from a requestor; in this case, step 1 is not needed.

In step 3, the service layer sends a Message Template Policy Association Response to the requestor to indicate if the request in step 1 has been successfully processed.

Figure 32:
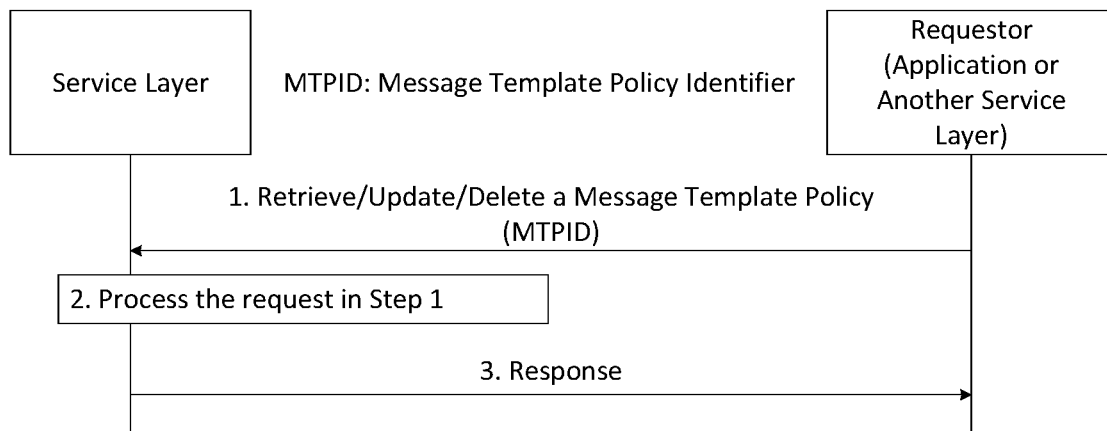
FIG. 32 illustrates a method for retrieving/updating/deleting an existing message template policy.

FIG. 32 illustrates a method for retrieving/updating/deleting an existing message template policy. In step 1, a requestor sends a request to a service layer to retrieve, update, or delete an existing message template policy. This message contains the identifier of the existing message template policy (i.e. MTPID) to be operated.

In step 2, the service layer processes the request from step 1. If step 1 requests to delete an existing message template policy and if the policy has been associated with one or multiple message templates already, the service layer may update those message templates and disassociate them with the policy being deleted.

In step 3, the service layer sends a response to the requestor. If step 1 requests to retrieve an existing message template policy, this message contains its representation.

The various aspects of message template management and usage described above may, in one embodiment, be implemented as a new message template management (MTM) CSF in the oneM2M functional architecture. Time-related oneM2M request parameters (e.g. Request Expiration Time, Result Expiration Time, Operational Execution Time, Result Persistence, etc) will include their relative values in the request template since relative values could stay the same for different request messages. This MTM CSF may reside in a CSE and expose its services to other CSEs and/or AEs. MTM CSF has the following functionalities which correspond to the aspects described above.
  MTM CSF can automatically generate message templates (i.e. <messageTemplate>) by receiving and analyzing requests from other Hosting CSEs.
  MTM CSF exposes <messageTemplate> resources to other AEs/CSEs. In other words, an AE/CSE can create/retrieve/update/delete a <messageTemplate> resource from MTM CSF. After a <messageTemplate> resource is created, an AE (or a CSE) can retrieve its representations and in turn use it to generate optimized requests if the <messageTemplate> is a request template.

The functional entities described above in connection with the various aspects of message template management may map to oneM2M entities as follows: 1) a Service Layer maps to a oneM2M CSE; and 2) Requestor maps to a oneM2M AE or CSE. For example, an IN-AE1 may create a <messageTemplate 1> at an IN-CSE1. Later on, the IN-AE1 can generate optimized requests based on the <messageTemplate 1> and send the optimized request to the IN-CSE1. Then, the IN-CSE1 uses <messageTemplate 1> to process the received optimized request. Also, the <messageTemplate 1> can be used by other applications such as IN-AE2 to generate optimized requests for the IN-CSE1.

Several new common attributes are proposed in Table 3.

TABLE 3

New Common Attributes for Message Template Management

| Attribute Name | Description |
|---|---|
| messageTemplateID | Indicates the list of existing message templates which are applicable to a resource. Any other message templates not included in this attribute cannot be used to perform any operation on the resource. |
| messageTemplateApplicability | Indicates if a resource can only be accessed using the templates as indicated by the messageTemplateID attribute (if messageTemplateApplicability = TRUE) or if the resource can be accessed using both the templates as indicated by the messageTemplateID attribute and any other regular access without using any template (messageTemplateApplicability = FALSE). |

Table 4 lists a new request message parameter for RETRIEVE, UPDATE, and DELETE operations, which can be used to support more efficient RESTful operation based on the message template management and usage techniques described above.

TABLE 4

Summary of New Request Message Parameters

| | Request message parameter | Operation | | | | |
|---|---|---|---|---|---|---|
| | | Create | Retrieve | Update | Delete | Notify |
| Optional | Request Template Identifier - Indicate the identifier of a request template to be used for processing this request | O | O | O | O | N/A |
| | Response Template Indicator - Indicate the requirements about creating and/or using a response template. | O | O | O | O | O |

A new response parameter—MTList—may be introduced, which can be included in a response message for AE or CSE registration. For example, when an AE/CSE registers to a hosting CSE, the hosting CSE will create an <AE> or a <remoteCSE> child resource under its CSEBase; in order to support the proposed message template assignment in Section 5.3, the hosting CSE selects appropriate message templates for the registered AE/CSE and include their identifiers (i.e. MTList parameter) in the response message. Furthermore, or alternatively, the hosting CSE can add MTList as a new attribute for the <AE> or <remoteCSE> resource to indicate that any template included in MTList is applicable to and can be used by the <AE> or the <remoteCSE>.

RSTCI and RSTID may be introduced as two new response parameters, which can be included in any response message from a CSE to an AE/CSE. RSTCI tells the recipient of the response message to create a new response template and this parameter contains all required information in order to create the response template; the identifier of the created response message shall be set to RSTID.

MTList may be introduced as a new attribute for existing oneM2M resources such as <CSEBase>, <node>, <AE> and <remoteCSE>. MTList includes a list of message template identifiers, which are applicable to and can be used by the application (as denoted by the <AE> and/or <node>) or the service layer (as denoted by the <CSEBase> and/or <remoteCSE>). This attribute is writable.

messageTemplate may be used to represent a message template. An AE/CSE can discover and retrieve a messageTemplate resource; then it can contain its identifier in a request message and there is no need to contain each individual request parameter. As such, the request message size will be reduced and in turn message overhead could be greatly decreased.

Figure 33:
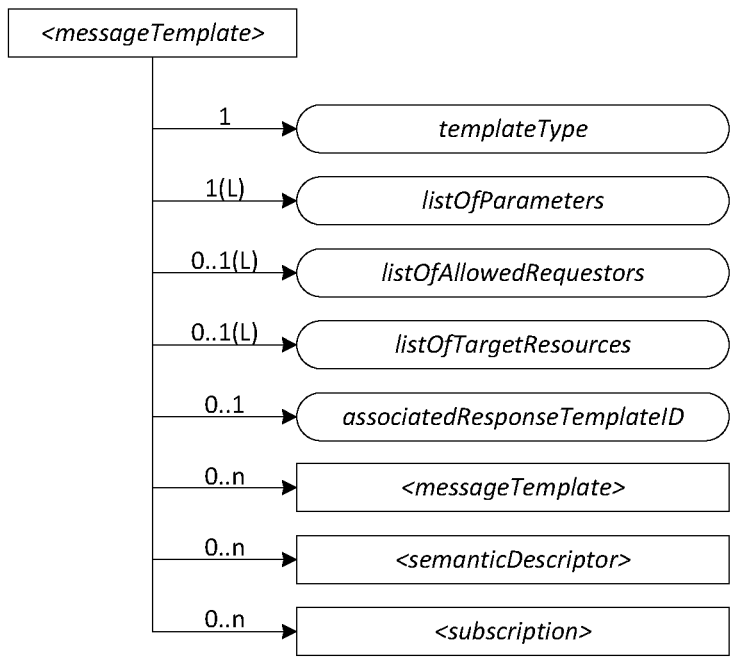
FIG. 33 illustrates one example of a structure for the messageTemplate resource.

FIG. 33 illustrates one example of a structure for the messageTemplate resource. The <messageTemplate> resource may contain the child resources specified in Table 5.

TABLE 5

Child resources of <messageTemplate> resource

| Child Resources of <messageTemplate> | Child Resource Type | Multiplicity | Description | <messageTemplate> Child Resource Types |
|---|---|---|---|---|
| [variable] | <messageTemplate> | 0 . . . n | A child resource used to describe another message template, which will be used as a part of this <messageTemplate>. | <messageTemplate> |
| [variable] | <subscription> | 0 . . . n | A child resource used to make subscriptions on <messageTemplate> resource. | <subscription> |
| [variable] | <semanticDescriptor> | 0 . . . n | Semantic description on <messageTemplate> resource. | <semanticDescriptor> |

The <messageTemplate> resource may contain the attributes specified in Table 6.

TABLE 6

Attributes of <messageTemplate> resource

| Attributes of <messageTemplate> | Multiplicity | RW/RO/ WO | Description | <messageTemplate> Attributes |
|---|---|---|---|---|
| templateType | 1 | WO | Indicates the type of this message template. The type could be request message template or response message template. | OA |
| listOfParameters | 1(L) | RW | Indicates a list of parameters potentially including their values for this template (i.e. request parameters for request message template, response parameters for response message template). | OA |
| listOfAllowedRequestors | 0 . . . 1(L) | RW | Indicates a list of requestors which can use this template. | OA |
| listOfTargetResources | 0 . . . 1(L) | RW | Indicates a list of target resources which this message template can be applied to. | OA |
| associatedResponseTemplateID | 0 . . . 1 | RW | Indicates the identifier of the corresponding response template if any, which shall be used for generating the response for a request message. The attribute is not needed for response message template. | OA |
| listOfMessageTemplatePolicies | 0 . . . 1(L) | RW | Indicates a list of message template policies applied to this message template. If this attribute is included, listOfAllowedRequestors and listOfTargetResources may not be needed. | OA |

Figure 34:
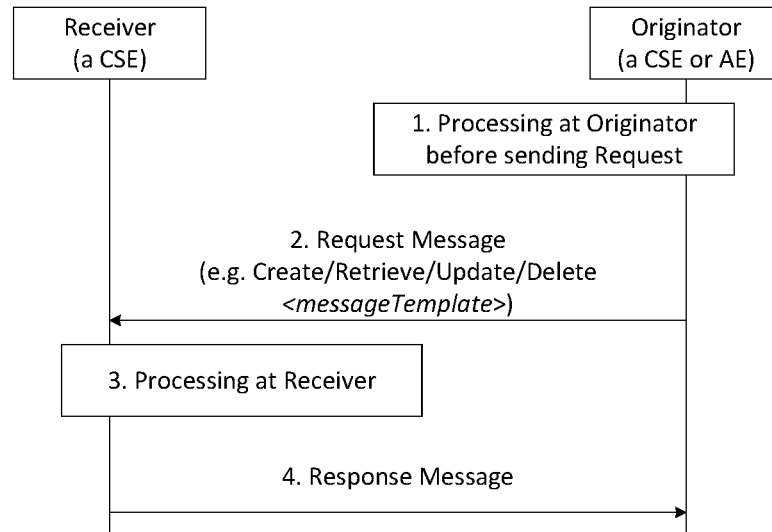
FIG. 34 illustrates a method to operate a <messageTemplate> resource (e.g. Create/Retrieve/Update/Delete a <messageTemplate> resource)

FIG. 34 illustrates a method to operate a <messageTemplate> resource (e.g. Create/Retrieve/Update/Delete a <messageTemplate> resource). The Originator can be a CSE or an AE, while the Receiver is a CSE. Detailed descriptions are given in Table 7, Table 8, Table 9, and Table 10, respectively.

A Create <messageTemplate> procedure may be used for creating a <messageTemplate> resource as described in Table 7.

TABLE 7

| <messageTemplate> CREATE | |
|---|---|
| <messageTemplate> CREATE | |
| Associated Reference Point | Mca, Mcc and Mcc'. |
| Information in Request message | All parameters defined in Table 8.1.2-3 in oneM2M-TS-0001 oneM2M Functional Architecture -V3.7.0 apply with the specific details for: Content: The resource content shall provide the information about a <messageTemplate> resource (e.g. attribute values) |

TABLE 7-continued

| | <messageTemplate> CREATE<br><messageTemplate> CREATE |
|---|---|
| Processing at Originator before sending Request | According to clause 10.1.1.1 in oneM2M-TS-0001 oneM2M Functional Architecture -V3.7.0. |
| Processing at Receiver | According to clause 10.1.1.1 in oneM2M-TS-0001 oneM2M Functional Architecture -V3.7.0. |
| Information in Response message | All parameters defined in Table 8.1.3-1 in oneM2M-TS-0001 oneM2M Functional Architecture -V3.7.0 apply with the specific details for:<br>Content: Address of the created <messageTemplate> resource according to clause 10.1.1.1 in oneM2M-TS-0001 oneM2M Functional Architecture -V3.7.0. |
| Processing at Originator after receiving Response | According to clause 10.1.1.1 in oneM2M-TS-0001 oneM2M Functional Architecture -V3.7.0. |
| Exceptions | According to clause 10.1.1.1 in oneM2M-TS-0001 oneM2M Functional Architecture -V3.7.0. |

A Retrieve <messageTemplate> procedure may be used for retrieving the attributes of an existing <messageTemplate> resource as described in Table 8.

TABLE 8

| | <messageTemplate> RETRIEVE<br><messageTemplate> RETRIEVE |
|---|---|
| Associated Reference Point | Mca, Mcc and Mcc'. |
| Information in Request message | All parameters defined in Table 8.1.2-3 in oneM2M-TS-0001 oneM2M Functional Architecture -V3.7.0 apply with the specific details for:<br>Content: void. |
| Processing at Originator before sending Request | According to clause 10.1.2 in oneM2M-TS-0001 oneM2M Functional Architecture -V3.7.0. |
| Processing at Receiver | The Receiver shall verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 oneM2M Functional Architecture -V3.7.0 applies. |
| Information in Response message | All parameters defined in Table 8.1.3-1 in oneM2M-TS-0001 oneM2M Functional Architecture -V3.7.0 apply with the specific details for:<br>Content: attributes of the <messageTemplate> resource |
| Processing at Originator after receiving Response | According to clause 10.1.2 in oneM2M-TS-0001 oneM2M Functional Architecture -V3.7.0. |
| Exceptions | According to clause 10.1.2 in oneM2M-TS-0001 oneM2M Functional Architecture -V3.7.0. |

An Update <messageTemplate> procedure may be used to update an existing <messageTemplate> resource as described in Table 9, e.g. an update to its listOfAllowedRequestors attribute.

TABLE 9

| | <messageTemplate> UPDATE<br><messageTemplate> UPDATE |
|---|---|
| Associated Reference Point | Mca, Mcc and Mcc'. |
| Information in Request message | All parameters defined in Table 8.1.2-3 in oneM2M-TS-0001 oneM2M Functional Architecture -V3.7.0apply with the specific details for:<br>Content: attributes of the <messageTemplate> resource as defined in Section 6.1.5.1 to be updated. |

TABLE 9-continued

| | <messageTemplate> UPDATE |
| --- | --- |
| | <messageTemplate> UPDATE |
| Processing at Originator before sending Request | According to clause 10.1.3 in oneM2M-TS-0001 oneM2M Functional Architecture -V3.7.0. |
| Processing at Receiver | According to clause 10.1.3 in oneM2M-TS-0001 oneM2M Functional Architecture -V3.7.0. |
| Information in Response message | According to clause 10.1.3 in oneM2M-TS-0001 oneM2M Functional Architecture -V3.7.0. |
| Processing at Originator after receiving Response | According to clause 10.1.3 in oneM2M-TS-0001 oneM2M Functional Architecture -V3.7.0. |
| Exceptions | According to clause 10.1.3 in oneM2M-TS-0001 oneM2M Functional Architecture -V3.7.0. |

A Delete <messageTemplate> procedure may be used to delete an existing <messageTemplate> resource as described in Table 10.

TABLE 10

| | <messageTemplate> DELETE |
| --- | --- |
| | <messageTemplate> DELETE |
| Associated Reference Point | Mca, Mcc and Mcc'. |
| Information in Request message | All parameters defined in Table 8.1.2-3 in oneM2M-TS-0001 oneM2M Functional Architecture -V3.7.0 apply. |
| Processing at Originator before sending Request | According to clause 10.1.4.1 in oneM2M-TS-0001 oneM2M Functional Architecture -V3.7.0. |
| Processing at Receiver | According to clause 10.1.4.1 in oneM2M-TS-0001 oneM2M Functional Architecture -V3.7.0. |
| Information in Response message | According to clause 10.1.4.1 in oneM2M-TS-0001 oneM2M Functional Architecture -V3.7.0. |
| Processing at Originator after receiving Response | According to clause 10.1.4.1 in oneM2M-TS-0001 oneM2M Functional Architecture -V3.7.0. |
| Exceptions | According to clause 10.1.4.1 in oneM2M-TS-0001 oneM2M Functional Architecture -V3.7.0. |

Figure 35:
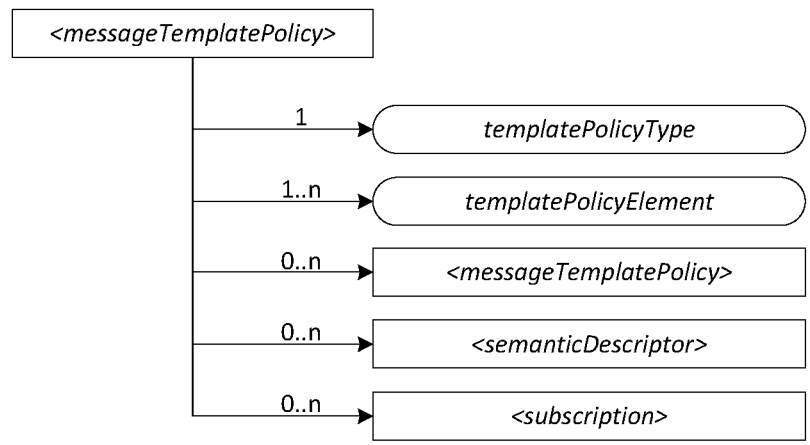
FIG. 35 illustrates a structure of a messageTemplatePolicy resource.

A new messageTemplatePolicy resource may be used to represent a message template. An AE/CSE can discover and retrieve a messageTemplatePolicy resource; then it can associate it with one or more message templates. The structure of messageTemplatePolicy resource in accordance with one embodiment is illustrated in FIG. 35.

The <messageTemplatePolicy> resource may contain the child resources specified in Table 11.

TABLE 11

| Child resources of <messageTemplatePolicy> resource | | | | |
| --- | --- | --- | --- | --- |
| Child Resources of <messageTemplatePolicy> | Child Resource Type | Multiplicity | Description | <messageTemplatePolicy> Child Resource Types |
| [variable] | <messageTemplatePolicy> | 0 . . . n | A child resource used to describe another message template policy, which will be used as a part of this <messageTemplatePolicy>. | <messageTemplate> |
| [variable] | <subscription> | 0 . . . n | A child resource used to make subscriptions on <messageTemplate> resource. | <subscription> |
| [variable] | <semanticDescriptor> | 0 . . . n | Semantic description on <message Template > resource. | <semanticDescriptor> |

The <messageTemplatePolicy> resource may contain the attributes specified in Table 12.

TABLE 12

Attributes of <messageTemplatePolicy> resource

| Attributes of <messageTemplatePolicy> | Multiplicity | RW/RO/WO | Description | <messageTemplatePolicy> Attributes |
|---|---|---|---|---|
| templatePolicyType | 1 | WO | Indicates the type of this message template policy. The type could be request message template policy or response message template policy. | OA |
| templatePolicyElement | 1:n | RW | Describes what the policy defines, allows, limits, etc. A policy could consist of multiple templatePolicyElements, which together in a union and/or intersection operation define the whole policy. A policyElement could be based on or describe the following conditions: Requests targeting resources locally hosted by a service layer can use message template Requests targeting resources hosted on remote service layer can use message template Requests targeting resources of a specific type can use message template Requests from requesters that are registrants to a service layer can use message template Requests issued in a certain time window can use message template Requests issued from certain locations can use message template Requests targeting devices in certain locations can use message template Requests that exceed a certain size threshold can use message template Requests that are issued with a rate that exceed a certain threshold can use message template. | OA |

Figure 36:
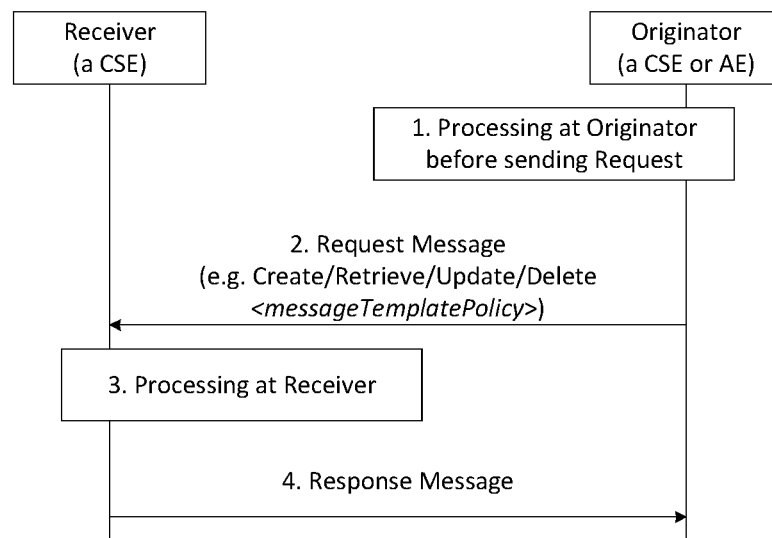
FIG. 36 illustrates a method to operate a <messageTemplatePolicy> resource (e.g. Create/Retrieve/Update/Delete a <messageTemplatePolicy> resource)

FIG. 36 illustrates a method to operate a <messageTemplatePolicy> resource (e.g. Create/Retrieve/Update/Delete a <messageTemplatePolicy> resource). The Originator can be a CSE or an AE, while the Receiver is a CSE. Detailed descriptions are given in Table 13, Table 14, Table 15, and Table 16, respectively.

A Create <messageTemplatePolicy> procedure may be used for creating a <messageTemplatePolicy> resource as described in Table 13.

TABLE 13

| <messageTemplatePolicy> CREATE | |
|---|---|
| <messageTemplatePolicy> CREATE | |
| Associated Reference Point | Mca, Mcc and Mcc'. |
| Information in Request message | All parameters defined in Table 8.1.2-3 in oneM2M-TS-0001 oneM2M Functional Architecture -V3.7.0 apply with the specific details for: Content: The resource content shall provide the information about a <messageTemplatePolicy> resource (e.g. attribute values) as described in Section 6.1.6.1. |
| Processing at Originator before sending Request | According to clause 10.1.1.1 in oneM2M-TS-0001 oneM2M Functional Architecture -V3.7.0. |
| Processing at Receiver | According to clause 10.1.1.1 in oneM2M-TS-0001 oneM2M Functional Architecture -V3.7.0. |
| Information in Response message | All parameters defined in Table 8.1.3-1 in oneM2M-TS-0001 oneM2M Functional Architecture -V3.7.0 apply with the specific details for: Content: Address of the created <messageTemplatePolicy> resource according to clause 10.1.1.1 in oneM2M-TS-0001 oneM2M Functional Architecture -V3.7.0. |
| Processing at Originator after receiving Response | According to clause 10.1.1.1 in oneM2M-TS-0001 oneM2M Functional Architecture -V3.7.0. |
| Exceptions | According to clause 10.1.1.1 in oneM2M-TS-0001 oneM2M Functional Architecture -V3.7.0. |

A Retrieve <messageTemplatePolicy> procedure may be used for retrieving the attributes of an existing <messageTemplatePolicy> resource as described in Table 14.

TABLE 14

| | <messageTemplatePolicy> RETRIEVE<br><messageTemplatePolicy> RETRIEVE |
|---|---|
| Associated Reference Point | Mca, Mcc and Mcc'. |
| Information in Request message | All parameters defined in Table 8.1.2-3 in oneM2M-TS-0001 oneM2M Functional Architecture -V3.7.0 apply with the specific details for:<br>Content: void |
| Processing at Originator before sending Request | According to clause 10.1.2 in oneM2M-TS-0001 oneM2M Functional Architecture -V3.7.0. |
| Processing at Receiver | The Receiver shall verify the existence (including Filter Criteria checking, if it is given) of the target resource or the attribute and check if the Originator has appropriate privileges to retrieve information stored in the resource/attribute. Otherwise clause 10.1.2 in oneM2M-TS-0001 oneM2M Functional Architecture -V3.7.0 applies. |
| Information in Response message | All parameters defined in Table 8.1.3-1 in oneM2M-TS-0001 oneM2M Functional Architecture -V3.7.0 apply with the specific details for:<br>Content: attributes of the <messageTemplatePolicy> resource as defined in Section 6.1.6.1. |
| Processing at Originator after receiving Response | According to clause 10.1.2 in oneM2M-TS-0001 oneM2M Functional Architecture -V3.7.0. |
| Exceptions | According to clause 10.1.2 in oneM2M-TS-0001 oneM2M Functional Architecture -V3.7.0. |

An Update <messageTemplatePolicy> procedure may be used to update an existing <messageTemplatePolicy> resource as described in Table 15, e.g. an update to its templatePolicyElement attribute.

TABLE 15

| | <messageTemplatePolicy> UPDATE<br><messageTemplatePolicy> UPDATE |
|---|---|
| Associated Reference Point | Mca, Mcc and Mcc'. |
| Information in Request message | All parameters defined in Table 8.1.2-3 in oneM2M-TS-0001 oneM2M Functional Architecture -V3.7.0 apply with the specific details for:<br>Content: attributes of the <messageTemplate> resource as defined in Section 6.1.6.1 to be updated. |
| Processing at Originator before sending Request | According to clause 10.1.3 in oneM2M-TS-0001 oneM2M Functional Architecture -V3.7.0. |
| Processing at Receiver | According to clause 10.1.3 in oneM2M-TS-0001 oneM2M Functional Architecture -V3.7.0. |
| Information in Response message | According to clause 10.1.3 in oneM2M-TS-0001 oneM2M Functional Architecture -V3.7.0. |
| Processing at Originator after receiving Response | According to clause 10.1.3 in oneM2M-TS-0001 oneM2M Functional Architecture -V3.7.0. |
| Exceptions | According to clause 10.1.3 in oneM2M-TS-0001 oneM2M Functional Architecture -V3.7.0. |

A Delete <messageTemplatePolicy> procedure may be used to delete an existing <messageTemplatePolicy> resource as described in Table 16.

TABLE 16

|  | <messageTemplatePolicy> DELETE<br><messageTemplatePolicy> DELETE |
|---|---|
| Associated Reference Point | Mca, Mcc and Mcc'. |
| Information in Request message | All parameters defined in Table 8.1.2-3 in oneM2M-TS-0001 oneM2M Functional Architecture -V3.7.0 apply. |
| Processing at Originator before sending Request | According to clause 10.1.4.1 in oneM2M-TS-0001 oneM2M Functional Architecture -V3.7.0. |
| Processing at Receiver | According to clause 10.1.4.1 in oneM2M-TS-0001 oneM2M Functional Architecture -V3.7.0. |
| Information in Response message | According to clause 10.1.4.1 in oneM2M-TS-0001 oneM2M Functional Architecture -V3.7.0. |
| Processing at Originator after receiving Response | According to clause 10.1.4.1 in oneM2M-TS-0001 oneM2M Functional Architecture -V3.7.0. |
| Exceptions | According to clause 10.1.4.1 in oneM2M-TS-0001 oneM2M Functional Architecture -V3.7.0. |

Figure 37:
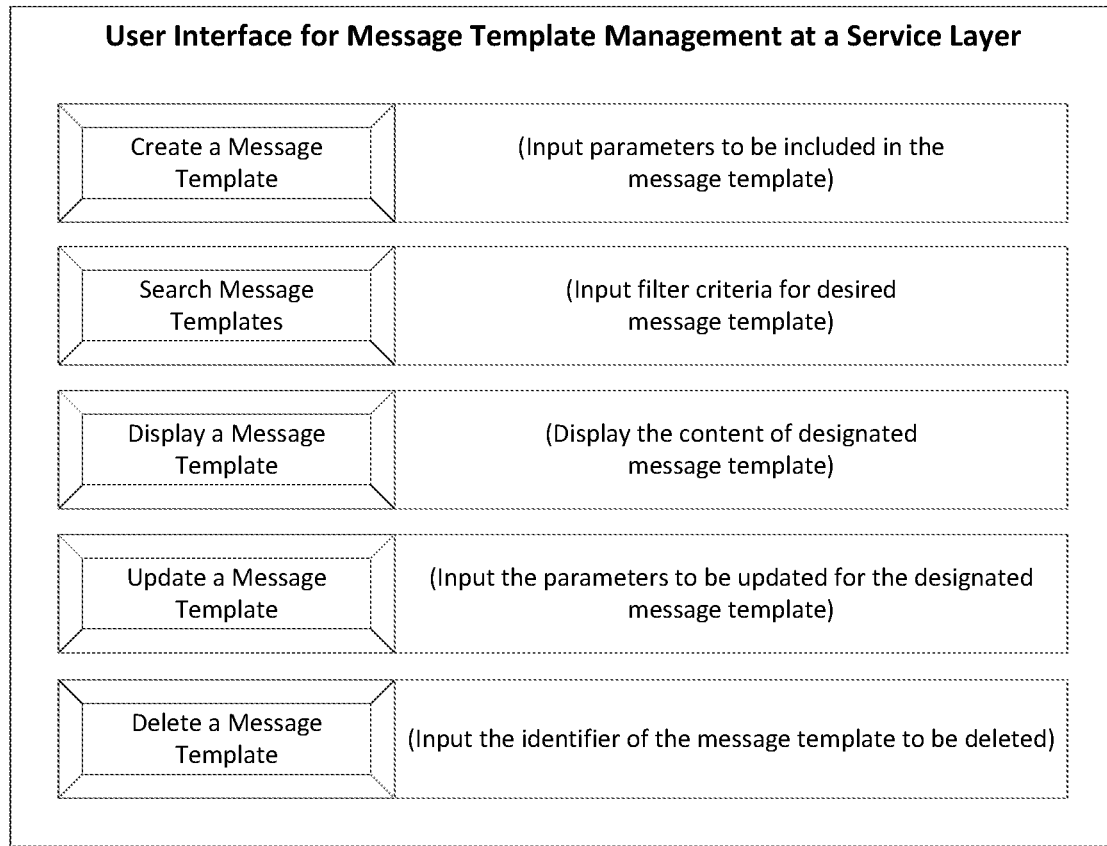
FIG. 37 illustrates one embodiment of a user interface for message template management at a service layer (e.g. an oneM2M CSE)

FIG. 37 illustrates one embodiment of a user interface for message template management at a service layer (e.g. an oneM2M CSE). This interface allows a user or an application to initiate and perform the following tasks via the CSE:

To create a new message template,
To search message templates,
To display one or more message templates,
To update one or more message templates, and
To delete one or more message templates.

Figure 38:
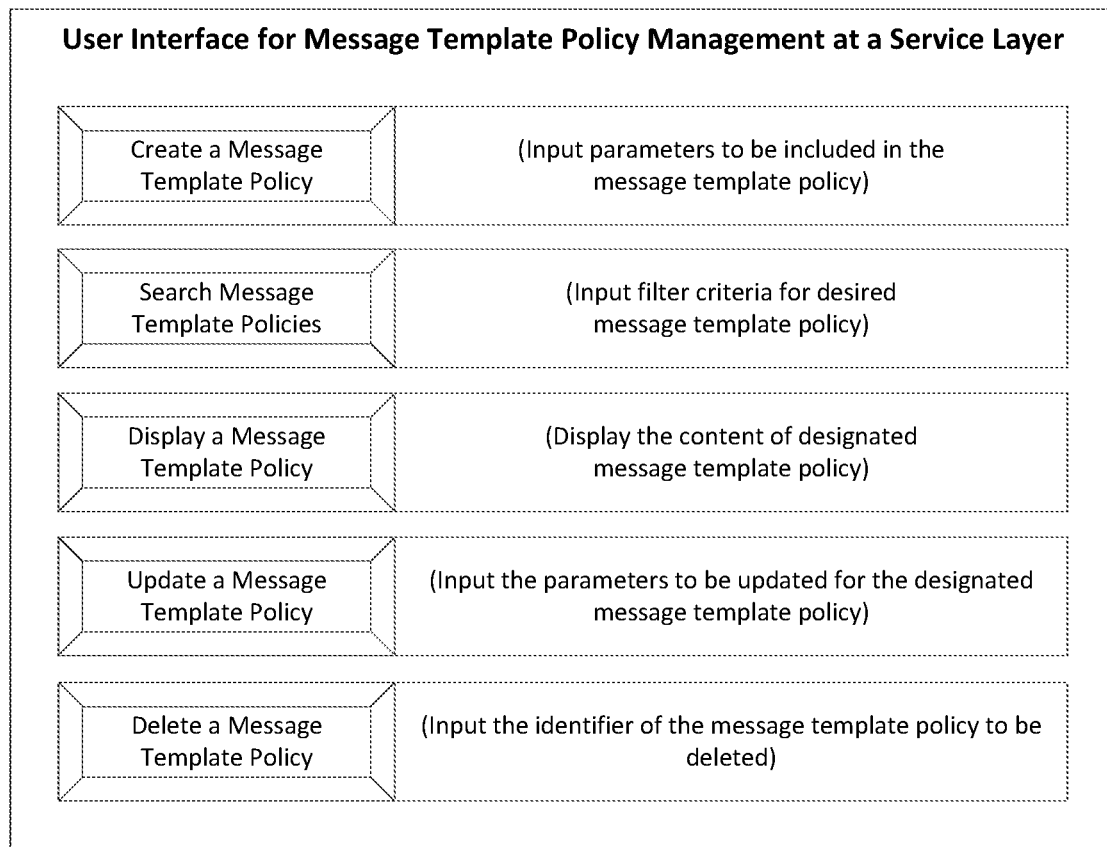
FIG. 38 illustrates a user interface for message template policy management at a service layer (e.g. an oneM2M CSE)

FIG. 38 illustrates a user interface for message template policy management at a service layer (e.g. an oneM2M CSE). This interface allows a user or an application to initiate and perform the following tasks via the CSE:

To create a new message template policy,
To search message template policies,
To display one or more message template policies,
To update one or more message template policies, and
To delete one or more message template policies.

The various aspects of message template management and usage described above may, in one embodiment, be implemented as a part of a Thing Description (TD) in the World Wide Web Consortium (W3C) Web of Things (WoT) architecture, where a WoT servient is defined as a logical module inside a device, gateway, and/or a server to support both client and server functionalities. Each WoT servient has a TD which describes how the WoT servient's resource shall be accessed. Taking the previous smart meter use case an example, the server will have or will be implemented as a WoT servient. In order to support the message template management, in one embodiment, the following procedures are proposed: 1) The server's WoT servient describes and includes a request template in its TD. This template could be the same as the example XML format template given above or contain more request parameters. In the TD, the WoT servient can also specify this template is only applicable to a smart meter (or more smart meters); 2) The smart meter as a WoT client discovers and retrieves the TD from the WoT servient or other places where the WoT servient's TD is stored; 3) The smart meter abstracts the template from the TD and understands the meaning of each parameter contained in the template; 4) The smart meter uses the template to generate an optimized request message (e.g. for reporting its meter reading to the server) which contains the template identifier; 5) The smart meter sends the optimized request to the WoT servient (i.e. the server); 6) The WoT servient receives the optimized request and uses the corresponding template (as denoted by the template identifier contained in the optimized request) to process the optimized request; 7) The WoT servient sends a response to the smart meter. Alternatively, the smart meter (or other meters, WoT clients, WoT servients, etc) can actively create and/or insert a template into the WoT servient's TD by updating its TD.

Figure 39A:
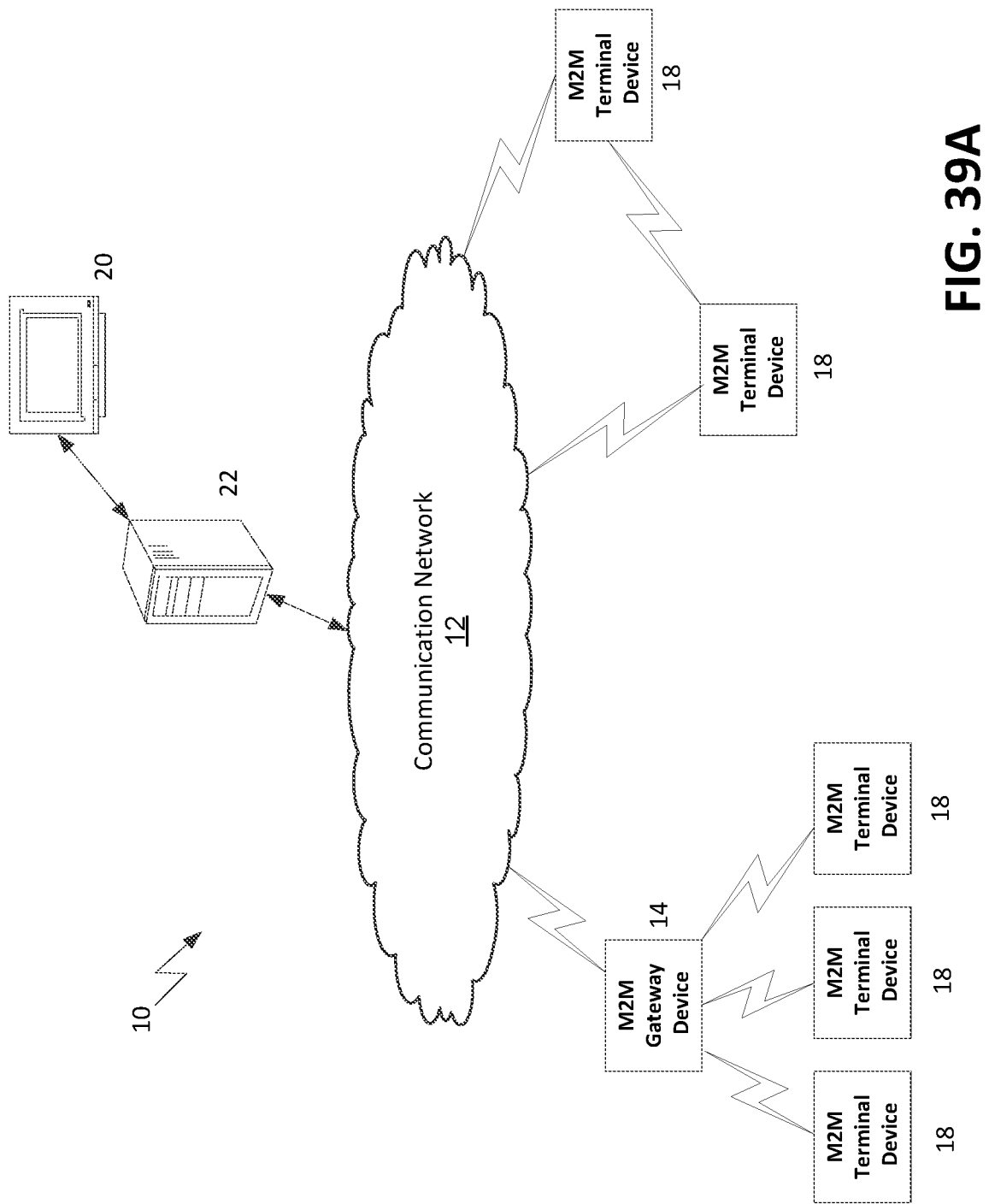
FIG. 39A is a system diagram of an example machine-to-machine (M2M), Internet of Things (IoT), or Web of Things (WoT) communication system in which one or more disclosed embodiments may be implemented.

FIG. 39A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or apparatus of the IoT/WoT as well as an IoT/WoT Service Layer, etc. Any of the entities illustrated in any of FIGS. 5-8, 10, 11, 13-32, 34 and 36 may comprise a network apparatus of a communication system, such as the ones illustrated in FIGS. 39A-D.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above-mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 39A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 39A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network apparatuses (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link.

A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 39B:
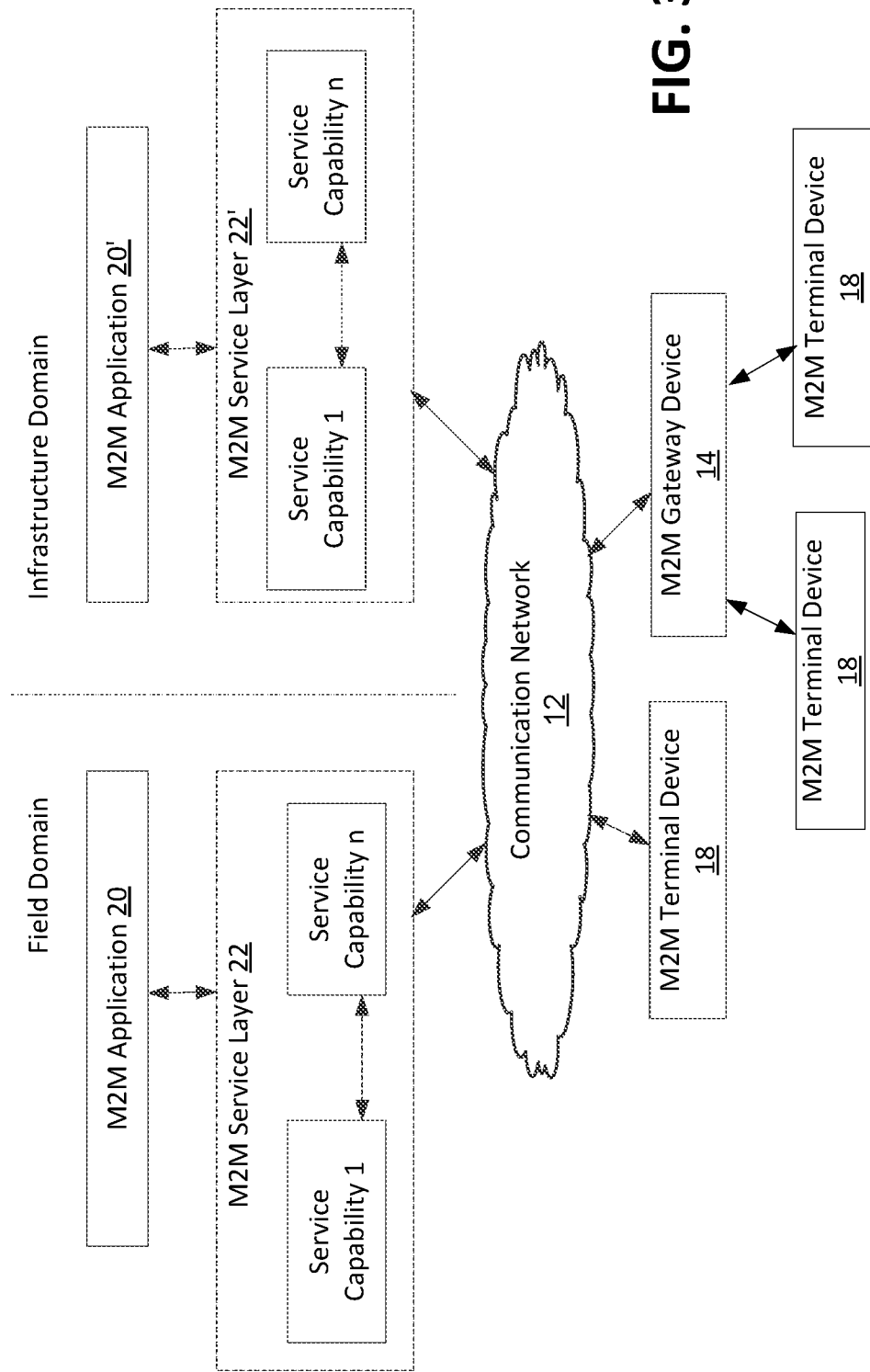
FIG. 39B is a system diagram of an example architecture that may be used within the M2M/IoT/WoT communications system illustrated in FIG. 39A.

Referring to FIG. 39B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more network apparatuses of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more network apparatuses of the network, which may comprise servers, computers, devices, virtual machines (e.g., cloud computing/storage farms, etc.) or the like.

Referring also to FIG. 39B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other network apparatuses of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 39B, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network apparatus (e.g., server, computer, gateway, device or the like) having the general architecture illustrated in FIG. 39C or FIG. 39D described below.

Further, the methods and functionalities described herein may be implemented as part of an M2M network that uses a Service Oriented Architecture (SOA) and/or a Resource-Oriented Architecture (ROA) to access services.

FIG. 39C is a block diagram of an example hardware/software architecture of an apparatus of a network, such as one of the entities illustrated in FIGS. 5-8, 10, 11, 13-32, 34 and 36, which may operate as an M2M server, gateway, device, or other network apparatus in an M2M network such as that illustrated in FIGS. 39A and 39B. As shown in FIG. 39C, the network apparatus 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The network apparatus 30 may also include communication circuitry, such as a transceiver 34 and a transmit/receive element 36. It will be appreciated that the network apparatus 30 may include any sub-combination of the foregoing elements while remaining consistent with an embodiment. This network apparatus may be an apparatus that implements the message template management capabilities and methods described herein, such as the methods operations illustrated and described in relation to FIGS. 5-8, 10, 11, 13-32, 34 and 36.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the network apparatus in order to perform the various required functions of the network apparatus. For example, the processor 32 may perform signal coding, data processing, power control, input/output processing, and/or any other functionality that enables the network apparatus 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 39C, the processor 32 is coupled to its communication circuitry (e.g., transceiver 34 and transmit/receive element 36). The processor 32, through the execution of computer executable instructions, may control the communication circuitry in order to cause the network apparatus 30 to communicate with other network apparatuses via the network to which it is connected. In particular, the processor 32 may control the communication circuitry in order to perform the transmitting and receiving steps described herein (e.g., in FIGS. 5-8, 10, 11, 13-32, 34 and 36) and in the claims. While FIG. 39C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other network apparatuses, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 39C as a single element, the network apparatus 30 may include any number of transmit/receive elements 36. More specifically, the network apparatus 30 may employ MIMO technology. Thus, in an embodiment, the network apparatus 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the network apparatus 30 may have multi-mode capabilities. Thus, the transceiver 34 may include multiple transceivers for enabling the network apparatus 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the network apparatus 30, such as on a server or a home computer. The processor 32 may be configured to control lighting patterns, images, or colors on the display or indicators 42 to reflect the status of an apparatus or configure an apparatus, and in particular underlying networks, applications, or other services in communication with the network apparatus. In one embodiment, the display/indicators 42 may present the graphical user interface illustrated in FIG. 31 and described herein.

The processor 32 may receive power from the power source 48, and may be configured to distribute and/or control the power to the other components in the network apparatus 30. The power source 48 may be any suitable device for powering the network apparatus 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the network apparatus 30. It will be appreciated that the network apparatus 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The network apparatus 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The network apparatus 30 may connect to other components, modules, or systems of such apparatuses or devices via one or more interconnect interfaces, such as an interconnect interface that may comprise one of the peripherals 52.

Figure 39D:
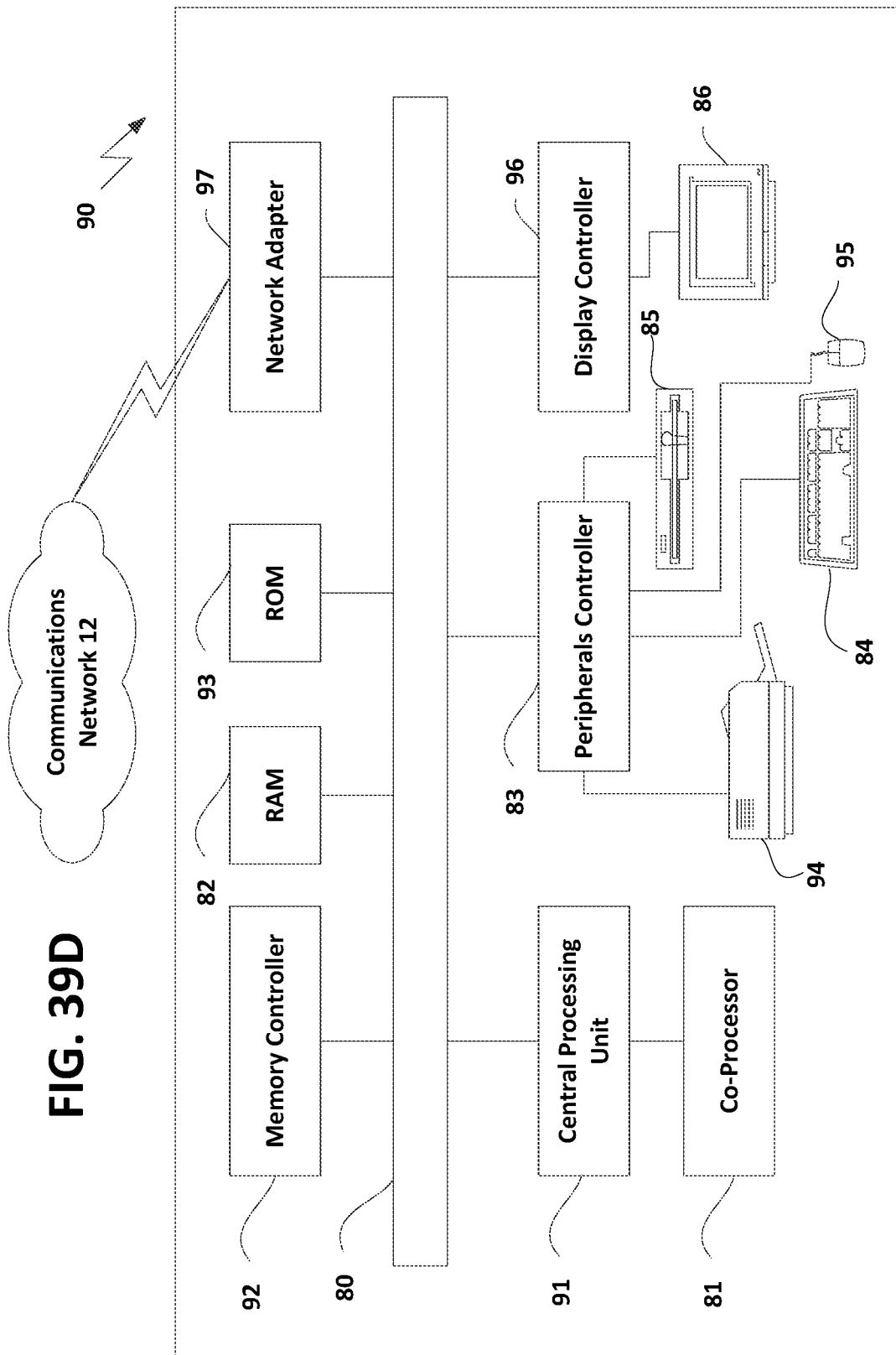
FIG. 39D is a block diagram of an example computing system in which a node or apparatus of the communication system of FIGS. 39A and 39B may be embodied.

FIG. 39D is a block diagram of an exemplary computing system 90 which may also be used to implement one or more network apparatuses of a network, such as the entities illustrated in FIGS. 5-8, 10, 11, 13-32, 34 and 36, and described herein, which may operate as an M2M server, gateway, device, or other network apparatus in an M2M network such as that illustrated in FIGS. 39A and 39B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Display 86, in combination with the computer-executable instructions executed by CPU 91, may generate and operate the graphical user interface illustrated and described in FIG. 25 and its accompanying description.

Further, computing system 90 may contain communication circuitry, such as for example a network adaptor 97, that may be used to connect computing system 90 to an external communications network, such as network 12 of FIG. 39A-D, to enable the computing system 90 to communicate with other apparatuses of the network. The communication circuitry, alone or in combination with the CPU 91, may be used to perform the transmitting and receiving steps described herein (e.g., in FIGS. 5-8, 10, 11, 13-32, 34 and 36) and in the claims.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below.

3GPP 3rd Generation Partnership Project
AE Application Entity
CSE Common Service Entity
CSF Common Service Function
IoT Internet of Things
M2M Machine-to-Machine
MT Message Template
MTCI Message Template Creation Indicator
MTID Message Template Identifier
MTM Message Template Management
MTP Message Template Policy
MTPID Message Template Policy Identifier
MTUI Message Template Update Indicator
NB-IoT Narrow-Band IoT
OCF Open Connectivity Foundation
REST Resource State Transfer
REQT Request Template
RQTCI Request Template Creation Indicator
RQTID Request Template Identifier
RSPT Response Template
RSTCI Response Template Creation Indicator
RSTID Response Template Identifier
UE User Equipment
URI Uniform Resource Identifier This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A network apparatus comprising at least one processor and memory, the memory storing executable instructions that, when executed by the at least one processor, implement a service of a communications network, the service supporting service capabilities through a set of Application Programming Interfaces (APIs), and cause the service to perform operations comprising:

storing, in the memory, one or more message templates, each message template, of the one or more message templates, comprising one or more values of parameters associated with a respective type of message that may be received by the service from one or more devices on the communications network and having a list of target resources identifying one or more target resources of the network apparatus that each message template applies to;

receiving a request to create a new request message template, the request to create a new request message template comprising one or more values of parameters associated with a respective type of message which the message template is to represent and one or more target resources that the message template applies to;

creating the new request message template, the new request message template comprising corresponding parameter values, wherein the corresponding parameter values are the received one or more values of parameters;

generating an identifier associated with the new request message template;

storing, in the memory, the new request message template in association with the identifier and the one or more target resources;

receiving, from a device on the communications network, a message targeting a resource of the network apparatus matching a target resource of the one or more target resources associated with the new request message template;

retrieving, from the memory in response to the message from the device, a stored message template associated with the resource targeted in the message received from the device;

combining information in the received message with parameter values in the retrieved stored message template to form a complete message;

processing the complete message; and sending, to the device in response to the message received from the device, a response message.

2. The network apparatus recited in claim 1, wherein the executable instructions further cause the service layer to perform operations comprising:

creating the new request message template, the new request message template comprising values of parameters to be associated with a response to the message received from the device, the response message template having an associated identifier;

providing to the device, or requesting that the device create its own copy of, the response message template along with its associated identifier; and wherein the response message comprises the identifier associated with the new request message template but not including the parameter values of the new request message template.

3. The network apparatus recited in claim 1, wherein the executable instructions further cause the service layer to perform operations comprising:

selecting a group of one or more devices on the network;

assigning to the group of devices one of the stored message template identifiers to be used by the devices of the group when sending request messages to the service layer; and sending the assigned message template identifier to the group of devices.

4. The network apparatus recited in claim 1, wherein the message received from the device is received from an application hosted by the device.

5. A method, comprising:

storing, in a memory of a service of a communications network, the service supporting service capabilities through a set of Application Programming Interfaces (APIs), one or more message templates, each message template, of the one or more message templates, comprising one or more values of parameters associated with a respective type of message that may be received by the service from one or more devices on the communications network and having a list of target resources identifying one or more target resources of the network apparatus that each message template applies to;

receiving a request to create a new request message template, the request to create a new request message template comprising one or more values of parameters associated with a respective type of message which the message template is to represent and one or more target resources that the message template applies to;

creating the new request message template, the new request message template comprising corresponding parameter values, wherein the corresponding parameter values are the received one or more values of parameters;

generating an identifier associated with the new request message template;

storing, in the memory, the new request message template in association with the identifier and the one or more target resources;

receiving, by the service, from a device on the communications network, a message targeting a resource of the network apparatus matching a target resource of the one or more target resources associated with the new request message template;

retrieving, by the service from the memory in response to the message from the device, a stored message template associated with the resource targeted in the message received from the device;

combining, by the service, information in the received message with parameter values in the retrieved stored message template to form a complete message;

processing, by the service layer entity, the complete message; and sending, to the device in response to the message received from the device, a response message.

6. The method of claim 5, further comprising:

creating, by the service, a the new request message template, the new request message template comprising values of parameters to be associated with a response to the message received from the device, the response message template having an associated identifier;

providing, by the service to the device, or requesting that the device create its own copy of, the response message template along with its associated identifier; and wherein the response message comprises the identifier associated with the new request message template but not including the parameter values of the new request message template.

7. The method of claim 5, further comprising:

selecting, by the service layer entity, a group of one or more devices on the network;

assigning, by the service layer entity to the group of devices, one of the stored message template identifiers to be used by the devices of the group when sending request messages to the service layer entity; and sending, by the service layer entity, the assigned message template identifier to the group of devices.

8. The method of claim 5, wherein the message received from the device is received from an application hosted by the device.

9. A device coupled to a communications network and comprising at least one processor and memory, the memory storing executable instructions that, when executed by the at least one processor, cause the device to perform operations comprising:

create a request message comprising information and an identifier of a message template, of one or more message templates stored at a service of the communications network, the service supporting service capabilities through a set of Application Programming Interfaces (APIs), the stored message template comprising one or more values of parameters associated with a respective type of the request message which the message template is to represent and one or more target resources that the message template applies to, wherein the request message targets a resource of a network apparatus matching a target resource of the one or more target resources associated with the message template;

sending a request to create a new request message template, the request to create a new request message template comprising one or more values of parameters associated with a respective type of message which the message template is to represent and one or more target resources that the message template applies to, wherein the request causes the network apparatus to:

create the new request message template, the new request message template comprising corresponding parameter values, wherein the corresponding parameter values are the received one or more values of parameters, generate an identifier associated with the new request message template, and store, in the memory, the new request message template in association with the identifier and the one or more target resources;

sending the request message to the service, wherein the request message comprises the information and the identifier associated with the new request message template and targets a resource of the network apparatus matching a target resource of the one or more target resources associated with the new request message template; and receiving, from the service, a response message.

\* \* \* \* \*